(12) United States Patent
White

(10) Patent No.: US 8,370,832 B2
(45) Date of Patent: Feb. 5, 2013

(54) METHOD AND SYSTEM FOR VIRTUAL MACHINE MIGRATION

(75) Inventor: Anthony Richard Phillip White, Ottawa (CA)

(73) Assignee: Embotics Corporation, Ottawa, Ontario (CA)

( * ) Notice: Subject to any disclaimer, the term of this patent is extended or adjusted under 35 U.S.C. 154(b) by 1022 days.

(21) Appl. No.: 11/839,481

(22) Filed: Aug. 15, 2007

(65) Prior Publication Data

US 2007/0283348 A1    Dec. 6, 2007

Related U.S. Application Data

(63) Continuation-in-part of application No. 11/748,816, filed on May 15, 2007.

(30) Foreign Application Priority Data

May 15, 2006    (CA) .................................... 2547047

(51) Int. Cl.
G06F 9/455    (2006.01)
G06F 9/46    (2006.01)

(52) U.S. Cl. ............................................ 718/1; 718/104
(58) Field of Classification Search ............... 718/1, 104
See application file for complete search history.

(56) References Cited

U.S. PATENT DOCUMENTS

| | | | |
|---|---|---|---|
| 6,696,017 B2 * | 2/2004 | Nagai et al. .................. | 420/442 |
| 6,698,017 B1 * | 2/2004 | Adamovits et al. ........... | 717/168 |
| 2003/0033344 A1 * | 2/2003 | Abbott et al. .................. | 718/1 |
| 2004/0205772 A1 * | 10/2004 | Uszok et al. .................. | 719/317 |
| 2005/0060567 A1 | 3/2005 | Shannon et al. | |
| 2005/0132367 A1 * | 6/2005 | Tewari et al. .................. | 718/1 |
| 2005/0268298 A1 * | 12/2005 | Hunt et al. .................... | 718/1 |
| 2006/0165030 A1 * | 7/2006 | Fox et al. ..................... | 370/328 |

FOREIGN PATENT DOCUMENTS

| | | |
|---|---|---|
| CA | 2435655 | 1/2005 |
| CA | 2475387 | 1/2005 |

OTHER PUBLICATIONS

Mikael Desertot, Clement Escoffier, Didier Donsez; Autonomic management of J2EE edge servers; Nov. 2005; ACM New York, NY; MGC '05 Proceedings of the 3rd international workshop on Middleware for grid computing. p. 1-6.*
Brent A. Miller; The autonomic computing edge: Keeping in touch with touchpoints; Aug. 2, 2005. p. 1-7.*
Hinnelund, Patrick; Autonomic Computing—a Method for Automated Systems Management; 2004.*
Murch, R., Autonomic Computing, Prentice Hall, 2004.
R. Sterritt, D. W. Bustard, Autonomic Computing—a Means of Achieving Dependability?, Proceedings of IEEE International Conference on the Engineering of Computer Based Systems (ECBS'03), Huntsville, Alabama, USA, Apr. 7-11, 2003, p. 247-251.
Bieszczad A., White T., Pagurek B., Mobile Agents for Network Management, IEEE Communications Surveys, Sep. 1998.

(Continued)

*Primary Examiner* — Li B Zhen
*Assistant Examiner* — Bradford Wheaton
(74) *Attorney, Agent, or Firm* — Victoria Donnelly; IP-MEX Inc.

(57) ABSTRACT

Virtual machine (VM) technology allows multiple operating systems each deploying multiple applications to run on a single host. This invention presents an effective method and system for virtual machine migration from a source host to a target host. The method and system concern the migration of both the service VM and the element managing it. State of the migrating VM is preserved so that it can resume its execution on the target host.

37 Claims, 25 Drawing Sheets

OTHER PUBLICATIONS

White T., Pagurek B., and Bieszczad A., Network Modeling for Management Applications Using Intelligent Mobile Agents. In special issue on Mobile Agents of the Journal of Network and Systems Management, Sep. 1999.

White T., Bieszczad A., Pagurek B., Sugar G. and Tran X., Intelligent Network Management using Mobile Agents. In Proceedings of the Second Canadian Conference on Broadband Research (CCBR '98), Jun. 22-24, 1998, p. 376-384.

Bieszczad, A. and Pagurek, B., (1998), Network Management Application-Oriented Taxonomy of Mobile Code. Proceedings of the EEE/IFIP Network Operations and Management Symposium NOMS'98, New Orleans, Louisiana, Feb. 15-20, 1998.

Susilo, G., Bieszczad, A. and Pagurek, B. (1998), Infrastructure for Advanced Network Management based on Mobile Code. Proceedings of the IEEE/IFIP Network Operations and Management Symposium NOMS'98, New Orleans, Louisiana, Feb. 15-20, 1998.

Schramm, C., Bieszczad, A. and Pagurek, B. (1998), Application-Oriented Network Modeling with Mobile Agents. Proceedings of the IEEE/IFIP Network Operations and Management Symposium NOMS'98, New Orleans, Louisiana, Feb. 1998.

Bieszczad, A. and Pagurek, B. (1997), Towards plug-and-play networks with mobile code. Proceedings of the International Conference for Computer Communications ICCC'97, p. 255-269, Nov. 19-21, 1997, Cannes, France.

Milojicic, D. et al. "MASIF The OMG Mobile Agent System Interoperability Facility" hpl.hp.com/personal/Dejan_Milojicic/ma4.pdf, accessed May 5, 2006.

Anglets, IBM, trl.ibm.com/aglets/, accessed May 5, 2006.

Mobile Code Toolkit, sce.carleton.ca/netmanage/mctoolkit/, accessed May 5, 2006.

CORMAT A Component Oriented Mobile Agent Toolkit, scs.carleton.ca/~arpwhite/documents/honoursProjects/robert-young-winter-2005.pdf, accessed May 5, 2006.

* cited by examiner

METHOD AND SYSTEM FOR VIRTUAL MACHINE MIGRATION

RELATED APPLICATIONS

The present patent application is a Continuation-in-Part of the U.S. patent application Ser. No. 11/748,816 to Anthony WHITE entitled "A METHOD AND SYSTEM FOR VIRTUAL MACHINE MIGRATION" filed May 15, 2007, and claims priority from the Canadian patent application serial number 2,547,047 to Anthony WHITE entitled "MANAGEMENT OF VIRTUAL MACHINES USING MOBILE AUTONOMIC ELEMENTS" filed on May 15, 2006, and U.S. patent application Ser. No. 11/748,816 to Anthony WHITE entitled "A METHOD AND SYSTEM FOR VIRTUAL MACHINE MIGRATION" filed May 15, 2007, both of which are incorporated herein by reference.

FIELD OF INVENTION

The present invention relates to the management of virtual machines, and particularly to the management of virtual machine, while it is migrated from one host system to another by using mobile autonomic elements.

BACKGROUND OF THE INVENTION

The drive to make more effective use of physical resources within an enterprise information technology (IT) infrastructure has led to the introduction of virtual machine technology. Virtual machine (VM) technology allows one or more guest operating systems to run concurrently on one physical device. There are several approaches to providing virtualization technology, the most recent being para-virtualization and native central processing unit (CPU) with basic input/output system (BIOS) or Extensible Firmware Interface (EFI) support. Concurrent with these approaches, the emergence of the management plane has occurred as the means by which hardware, operating system and applications are managed within the service plane.

One or more virtual machines may be operational on a single host computing system that will be referred to simply as a host system. A VM that may include an operating system with its concurrent applications is often separated from the elements that manage the VMs on the host system. The separation of management and service functionality has a number of distinct advantages that include separation of concerns, management of change and security improvements.

Finally, delegated management through the paradigm of Autonomic Computing has emerged. Autonomic Computing is a relatively recent field of study that focuses on the ability of computers to self-manage. Autonomic Computing is promoted as the means by which greater independence will be achieved in systems. This incorporates self-diagnosis, self-healing, self-configuration and other independent behaviors, both reactive and proactive. Such systems will adapt and learn normal levels of resource usage and predict likely points of failure in the system. Certain benefits of computers that are capable of adapting to their usage environments and recovering from failures without human interaction have also been known to reduce the total cost of ownership of a device and increasing levels of system availability. Repetitive work performed by human administrators is reduced, knowledge of the system's performance over time is retained, assuming that the machine records or publishes information about the problems it detects and the solutions it applies, and events of significance are detected and handled with more consistency and speed than a human could likely provide. Such autonomic elements are used in the context of this invention for virtual machine management.

The introduction of virtualization along with management and service plane separation has produced a new important problem. A VM may be required to migrate from one host system to another. Such a migration may be necessary in various situations. These include an increase in the load of the system currently hosting the VM, the occurrence of a fault in the host system, and the temporary unavailability of the system for hosting a VM due to routine maintenance. Specifically, if a virtual machine migrates, the associated units of manageability need to move as well, where the problem extends to more than simply moving code.

The general area of code mobility is well researched. Various environments for the general mobility of software and state have been built. However, there has been no such infrastructure for an autonomic element, which applies specifically to the system management domain where virtual machines are under management. In particular there is no effective mechanism for transferring a VM from one host to another on which the VM and the management of it can resume operation seamlessly. Thus there is a need in the industry for an effective method and system for virtual machine migration by using mobile autonomic elements.

SUMMARY OF THE INVENTION

Therefore there is an object of the present invention to provide a method and system for the management of virtual machine migration from one host system to another by using mobile autonomic elements.

According to one aspect of the invention, there is provided a method for migrating a service Virtual Machine (VM), comprising a VM managed element and its dependent elements including components providing a service, from a source host to a target host, the method comprising the steps of:

(a) migrating the service VM during its execution by using an autonomic element including a sensor interface comprising a sensor service, and an effector interface for managing the migration of the service VM; (b) migrating policies managing the service VM in synchronization with the migrating of the service VM; and (c) resuming execution of the service VM under control of the policies migrated in step (b).

The step (a) of the method further comprises: (d) queueing events to be processed by the service VM at the source host; (e) sending information regarding a state of the VM managed element and its dependent elements from the source host to the target host; (f) sending information regarding a state of the events queued in step (d) from the source host to the target host; (g) sending components of the VM managed element that have changed during the execution of step (d)-step (f) from the source host to the target host; (h) processing the information sent in step (e) at the target host; and (i) processing the information sent in step (f) at the target host. The step (b) of the method further comprises the steps of: (v) storing policies within the autonomic element; and (w) migrating the policies contained in the autonomic element prior to executing the service VM on the target host. The step (d) further comprises the steps of: locating a sensor service; and creating a queue of events within the sensor service and preventing further events to be forwarded to the VM managed element. The step (e) further comprises the steps of: (j) serializing the state of the VM managed element and its dependent elements; and (k) sending a message containing a serialized state of the VM managed element and its dependent elements generated in step (j) from the source host to the target host. Step (f) further comprises the steps of: (l) serializing the queued events for the VM managed element and its dependent elements at the source host; and (m) sending a message including a serialized queue of events generated in step (l) to the target host. Step (g) further comprises the steps of: (n) serializing the components of the VM managed element and its dependent elements that have changed; and (o) sending serialized components of the VM managed element produced in step (n) from the source host to the target host. Step (h) further comprises the step of: deserializing the state of the VM managed element and extracting dependencies for its dependent elements at the target host. Step (i) further comprises the steps of: (x) deserializing the queued events and creating queues of events at the target host; and (y) locating a sensor service and inserting the queues of events created in step (x) into the sensor service.

The step (c) further comprises the steps of: (p) starting events for the VM managed element and its dependent elements at the target host; and (q) destroying the VM managed element at the source host. Step (p) further comprises the steps of: locating the sensor service; adding the events for the VM managed element to a time-ordered queue of events stored within the sensor service; and adding the events the dependent elements of the VM managed element to a time-ordered queue of events stored within the sensor service. Step (q) further comprises the step of: stopping the events for the VM managed element and its dependent elements.

According to another aspect of the invention, there is provided a method for migrating a service Virtual Machine (VM), comprising a VM managed element and its dependent elements including components providing a service, from a source host to a target host, the method comprising the steps of: (r) migrating the service VM during its execution; (s) migrating policies managing the service VM in synchronization with the migrating of the service VM; and (t) resuming execution of the service VM on the target host under control of the policies migrated in step (s).

According to yet another aspect of the invention, there is provided a computer program product for migrating a service VM, comprising a computer usable medium having computer readable program code means embodied in said medium for causing said computer to perform the steps of the method as described in steps (a) to (c).

According to one more aspect of the invention, there is provided a system for migrating a service Virtual Machine (VM), comprising a VM managed element and its dependent elements including components providing a service, from a source host to a target host, the system comprising: (a) means for migrating the service VM during its execution by using an autonomic element including a sensor interface comprising a sensor service, and an effector interface for managing the migration of the service VM; (b) means for migrating policies managing the service VM in synchronization with the migrating of the service VM; and (c) means for resuming execution of the service VM under control of the policies migrated by the means (b).

Means (a) further comprises: (d) means for queueing events to be processed by the service VM at the source host; (e) means for sending information regarding a state of the VM managed element and its dependent elements from the source host to the target host; (f) means for sending information regarding a state of the events queued from the source host to the target host; (g) means for sending components of the VM managed element that have changed during the processing performed by the means (d)-(f) from the source host to the target host; (h) means for processing the information sent by the means (e) at the target host; and (i) means for processing the information sent by the means (f) at the target host.

Means (b) further comprises: (v) means for storing policies within the autonomic element; and (w) means for migrating the policies contained in the autonomic element prior to executing the service VM on the target host. Means (d) further comprises: means for locating a sensor service; and means for creating a queue of events within the sensor service and preventing further events to be forwarded to the VM managed element. Means (e) further comprises: (j) means for serializing the state of the VM managed element and its dependent elements; and (k) means for sending a message containing a serialized state of the VM managed element and its dependent elements generated by the means (j) from the source host to the target host. Means (f) further comprises: (l) means for serializing the queued events for the VM managed element and its dependent elements at the source host; and (m) means for sending a message including a serialized queue of events generated by the means (l) to the target host. Means (g) further comprises: (n) means for serializing the components of the VM managed element and its dependent elements that have changed; and (o) means for sending serialized components of the VM managed element produced by the means (n) from the source host to the target host. Means (h) further comprises: means for deserializing the state of the VM managed element and extracting dependencies for its dependent elements at the target host. Means (i) further comprises: (x) means for deserializing the queued events and creating queues of events at the target host; and (y) means for locating a sensor service and inserting the queues of events created by the means (x) into the sensor service.

Means (c) further comprises: (p) means for starting events for the VM managed element and its dependent elements at the target host; and (q) means for destroying the VM managed element at the source host. Means (p) further comprises: means for locating the sensor service; means for adding the events for the VM managed element to a time-ordered queue of events stored within the sensor service; and means for adding the events the dependent elements of the VM managed element to a time-ordered queue of events stored within the sensor service. Means (q) further comprises: means for stopping the events for the VM managed element and its dependent elements.

According to yet one more aspect of the invention, there is provided a system for migrating a service Virtual Machine (VM), comprising a VM managed element and its dependent elements including components providing a service, from a source host to a target host, the system comprising of: (r) means for migrating the service VM during its execution; (s) means for migrating policies managing the service VM in synchronization with the migrating of the service VM; and (t) means for resuming execution of the service VM on the target host under control of the policies migrated by the means (s).

According to yet another aspect of the invention, there is provided a method for migrating a service Virtual Machine (VM), comprising a VM managed element and its dependent elements including components providing a service, from a source host to a target host, the method comprising the steps of:

(x) migrating the service VM during its execution under control of a Management VM comprising one or more autonomic elements managing the Service VM;

(y) migrating the management VM in synchronization with the migrating of the service VM; and (z) resuming execution of the service VM under control of the management VM migrated in step (y).

In the method described above, the step (y) further comprises the steps of: storing policies for managing the service VM within the autonomic elements; and migrating the policies prior to executing the service VM on the target host. Conveniently, the autonomic elements include respective sensor interfaces and effector interfaces for managing the migration of the service VM.

According to yet another aspect of the invention, there is provided a system for migrating a service Virtual Machine (VM), comprising a VM managed element and its dependent elements including components providing a service, from a source host to a target host, comprising:

(x) means for migrating the service VM during its execution under control of a management VM comprising one or more autonomic elements managing the service VM;

(y) means for migrating the management VM in synchronization with the migrating of the service VM; and (z) means for resuming execution of the service VM under control of the management VM migrated in step (y).

In the system described above, the means (y) further comprises:

means for storing policies for managing the service VM within the autonomic elements; and means for migrating the policies prior to executing the service VM on the target host.

Conveniently, the autonomic elements include respective sensor interfaces and effector interfaces for managing the migration of the service VM.

BRIEF DESCRIPTION OF THE DRAWINGS

Further features and advantages of the invention will be apparent from the following description of the embodiment, which is described by way of example only and with reference to the accompanying drawings in which:

FIG. 8 shows the pluggable service architecture used to support migration where a migration service is shown as a plug-in;

FIG. 10b presents the flowchart that illustrates the steps of the method for the procedure "Process Management Event State" used in the in the flowchart of FIG. 10a;

FIG. 14 presents the flowchart that further explains the step of the method for the procedure "Queue Events" captured in box 1004 of the flowchart presented in FIG. 10a;

FIG. 17 presents the flowchart that further explains the step of the method for "Serialize state for the VM managed element" captured in box 1006 of FIG. 10a;

FIG. 18 presents the flowchart that further explains the step of the method for "Send Management_State message" captured in box 1008 of FIG. 10a;

DETAILED DESCRIPTION OF THE EMBODIMENTS OF THE INVENTION

To facilitate the understanding of the present invention, a reference is made herein to the previously filed applications of Embotics Corporation, all of which are incorporated herein by reference:

Canadian patent applications serial numbers 2,435,655 and 2,475,387 to Shannon et al, both entitled "Embedded System Administration"; and Canadian patent applications serial numbers 2,504,333 and 2,543,938 to White et al, both entitled "Programming and Development Infrastructure For An Autonomic Element".

The present invention focuses on systems that use autonomic computing principles to manage virtual machines in a scenario where management and service are separated in distinct execution environments, also referred to as management and service planes respectively. A single management plane may provide manageability for one or more service planes. The invention provides a method and system for VM migration, and the infrastructure to support the mobility of manageability components that provide autonomic management for a migrating virtual machine, or more generally an execution container, which constitutes a service plane.

Figure 1:
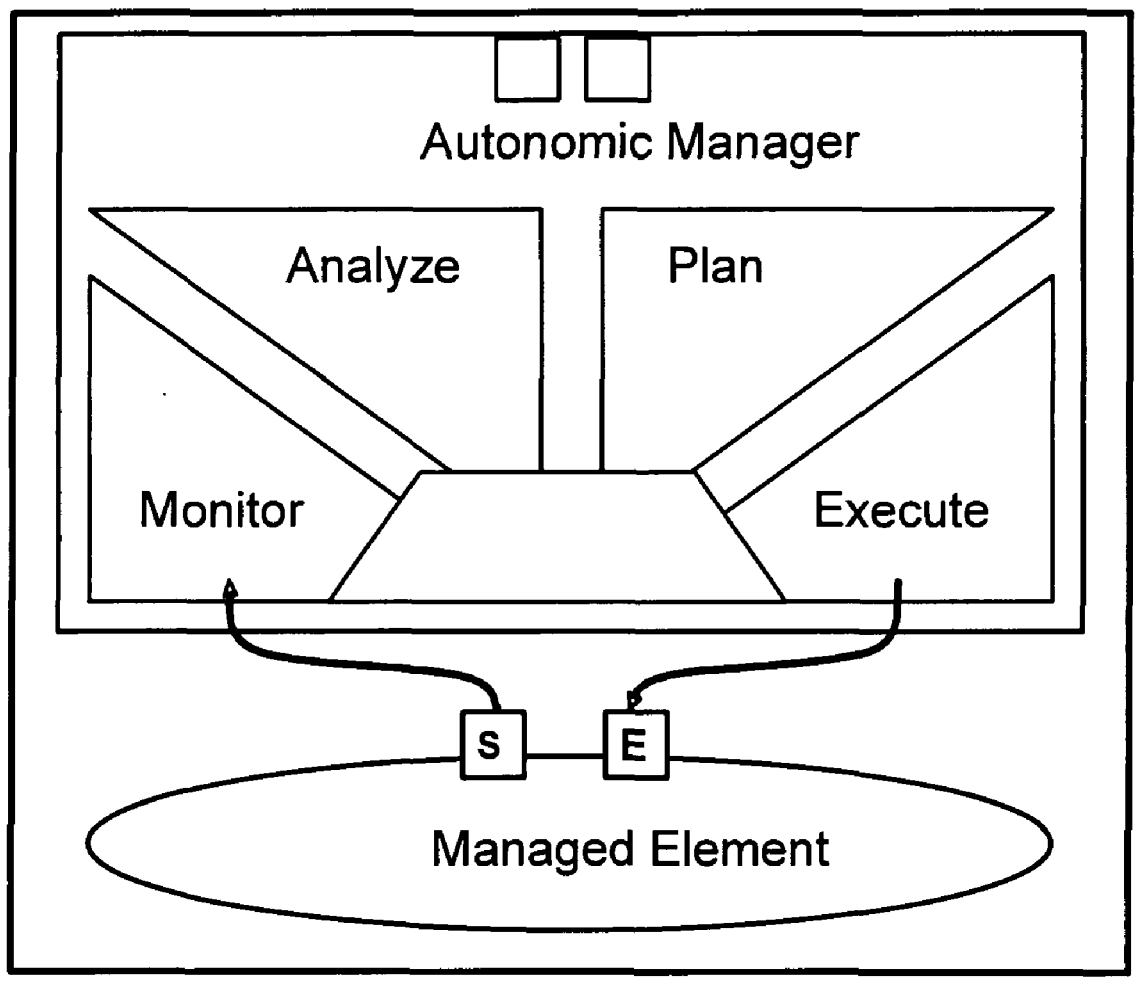
FIG. 1 shows an example of an autonomic element to which virtualization infrastructure in accordance with an embodiment of the present invention is suitably applied.

FIG. 1 illustrates an example of an embot, an autonomic management element developed by Embotics Corporation, to which virtualization infrastructure is applied. In FIG. 1, an autonomic element separates management from a managed element function, providing standard sensor (S) and effector (E) interfaces for management. Sensor interactions provide mechanisms or services for retrieving property values whereas effector interactions provide mechanisms or services for changing the system state. It should minimally impact the functions of the managed element. The managed element does not dominate, override or impede management activity. For example, if the managed element and the autonomic manager share the same processor or memory address space this cannot be guaranteed owing to the management of these shared resources by a shared operating system. True autonomy requires a control plane, which has long been the view in the telecommunications domain.

Figure 2:
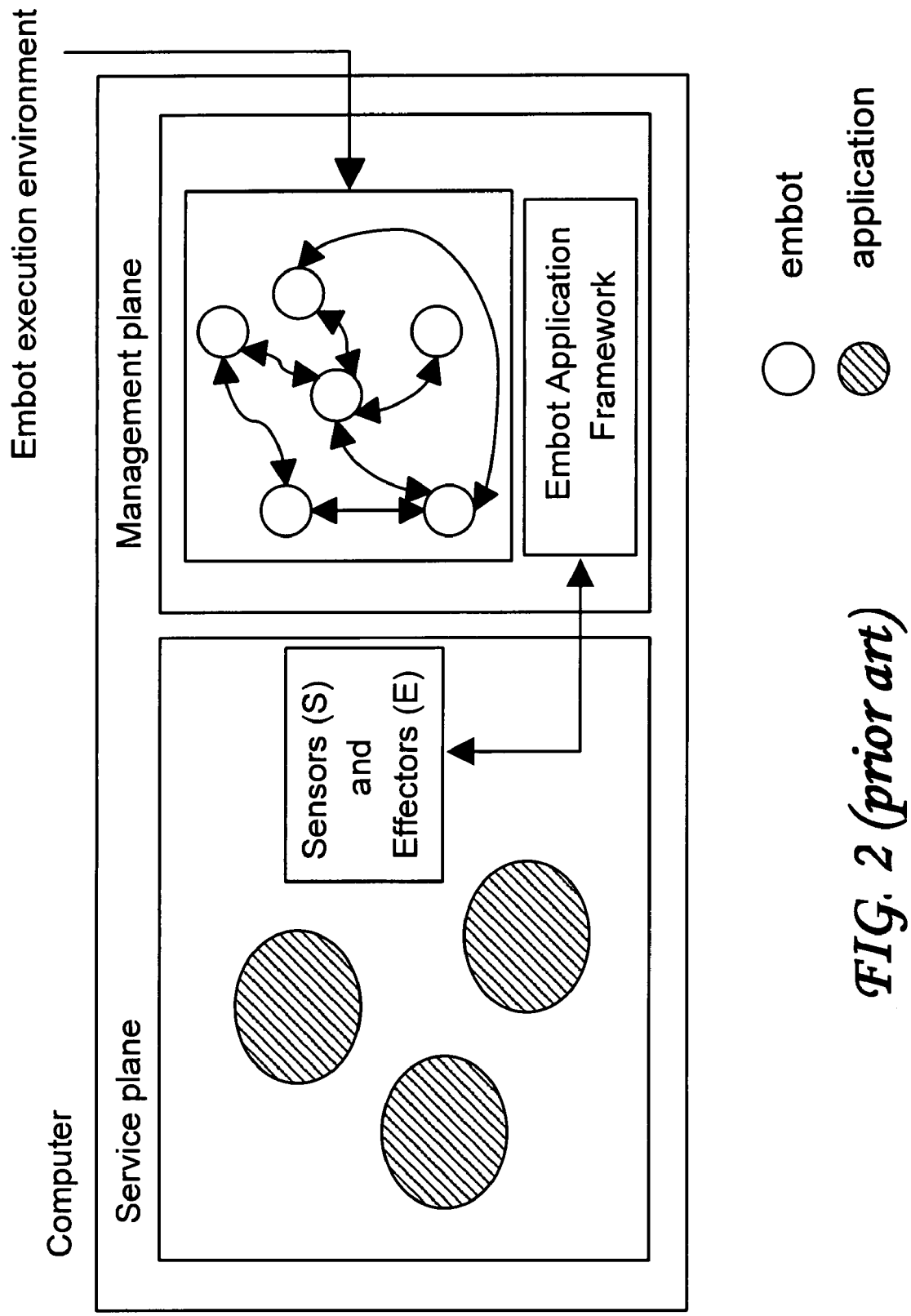
FIG. 2 shows the autonomic element of FIG. 1 that is achieved by separating the autonomic manager from the managed element.

The notion of the co-existence of a management and a service plane is explained with the help of FIG. 2. The management plane shown in FIG. 2 runs an application framework that provides a set of management services. One service is the management module runtime, which provides an execution environment for embots. All embots execute within this environment, which provides significant abstractions with respect to the service plane being managed. Embots are the smallest runtime units of manageability as provided by this invention. Embots are autonomic elements and created when a management module is deployed to the management plane and loaded. A management module is the smallest unit of deployable system administration. The nature of the management module is the subject of separate previous patent applications of Embotics Corporation cited above.

FIG. 2 shows that the embots running in the embot execution environment interact through the embot application framework with the service plane through sensor and effectors running on the service plane. While FIG. 2 shows a single service plane, a one-to-many management to service plane interaction is supported as would be typical in the scenario where the management plane is instantiated in a privileged virtual machine and the service planes are guest operating systems running within individual unprivileged virtual machines.

In some systems, referring to FIG. 1 and FIG. 2, an embot may represent the monitor, analyze, plan, execution and knowledge parts of an autonomic manager. On other systems, several embots communicating through the channels shown by arrows connecting them in FIG. 2 could collectively constitute the same functionality.

Figure 3:
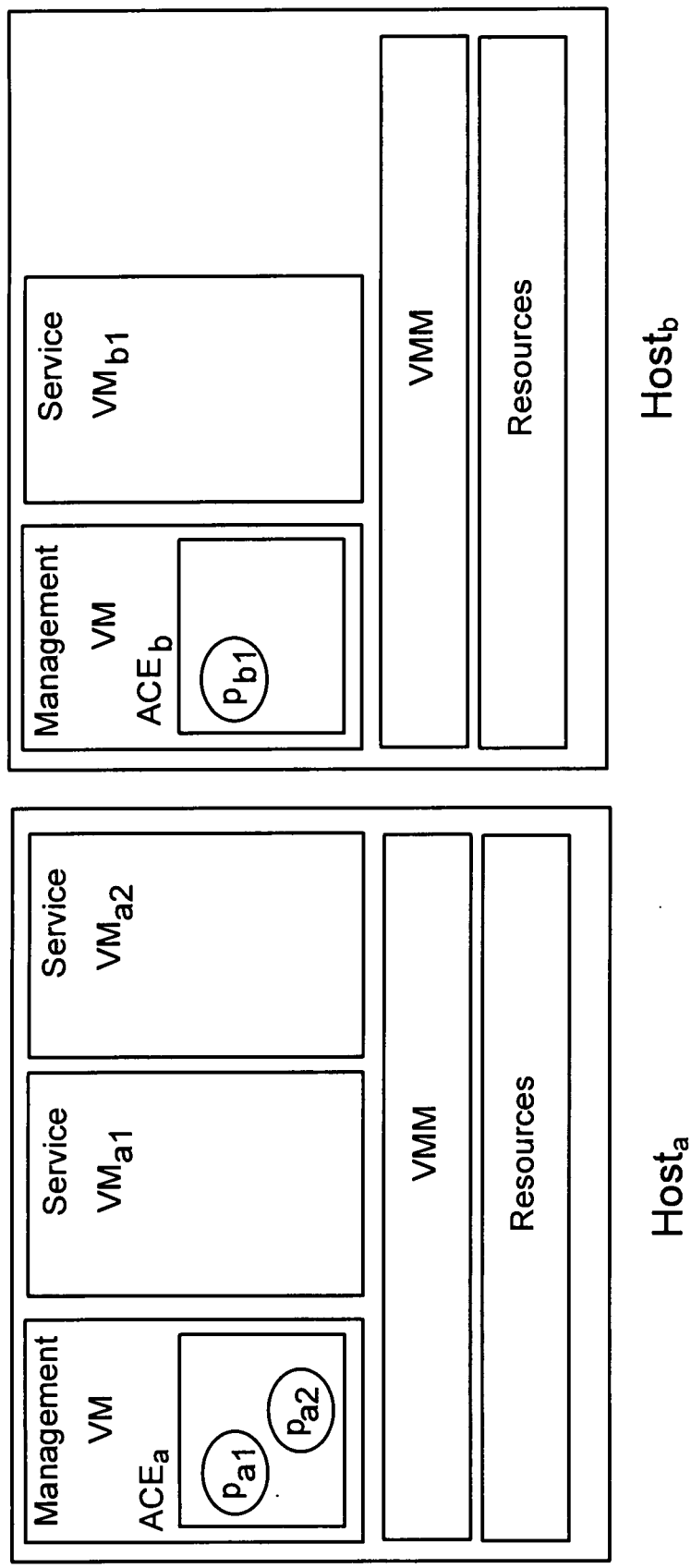
FIG. 3 presents a single management plane containing a single autonomic manager for each service plane under management.
Figure 4:
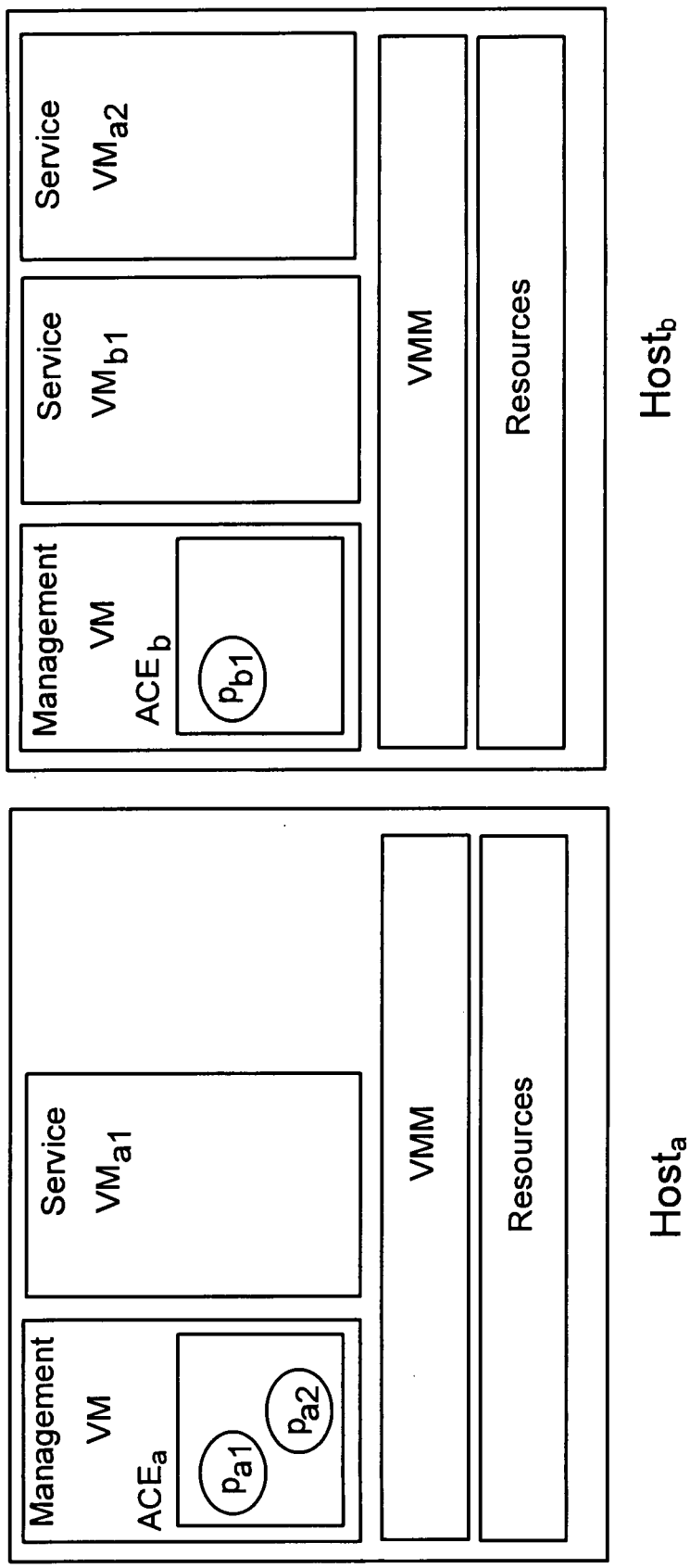
FIG. 4 shows the movement of a service plane from one host to another.
Figure 5:
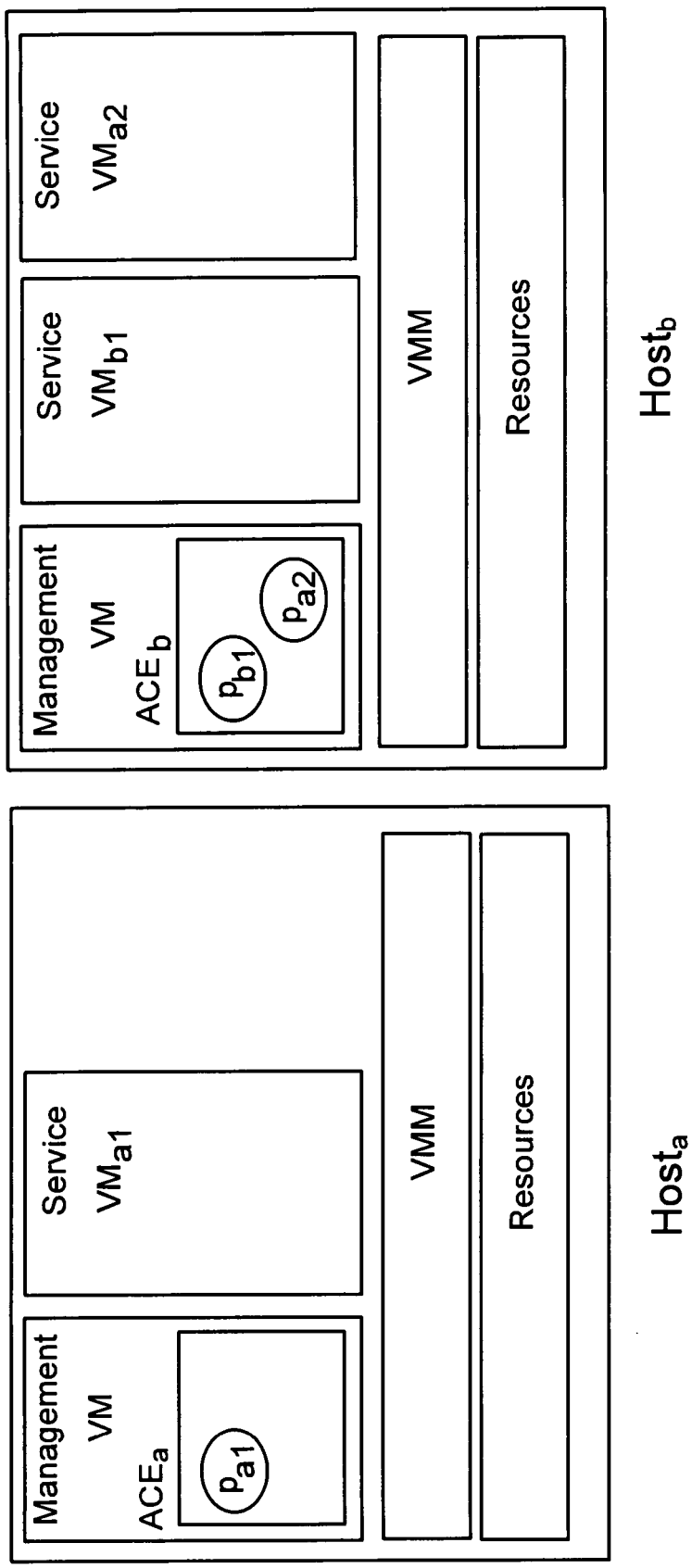
FIG. 5 shows the movement of the autonomic manager from the original host to the host where the service plane now resides.

FIG. 3, FIG. 4, and FIG. 5 demonstrate an example scenario in which a single management plane manages two service planes in a virtualized environment. In FIG. 3, FIG. 4, and FIG. 5, a Virtual Machine Manager (VMM) manages several VMs. Management of a VM is accomplished through an Autonomic Controller Engine (ACE), which is a software component running in the management plane and forms the autonomic element. Two types of VMs: a management VM and a service VM exist on the system (see FIG. 3 for example). The service VM includes a VM managed element with its components and its dependant elements that provide service to the user. The management VM is concerned with the management of one or more service VMs. A management VM is privileged. Privilege implies that the management VM is able to exert control of the resources made available to and consumed by a service VM. An example of a resource is network access and an example of management control could be denying access to the network. An example of a physical instantiation of a privileged virtual machine is Xen's domain 0. Each service VM is managed by a VM managing element. Several policies execute within the management plane, the policies being implemented within one or more embots. In FIG. 3, policy $p_{a1}$ is related to the management of virtual machine $VM_{a1}$, policy $p_{a2}$ is related to the management of virtual machine $VM_{a2}$. FIG. 4 shows that $VM_{a2}$ has migrated to a new host, host B. In order for $VM_{a2}$ to continue to be managed autonomically the policies used to manage it must be migrated too. FIG. 5 captures the changed system state and implies a requirement for code mobility. Individuals knowledgeable in the art of mobile agents will realize that many instantiations of mobile code (or agents, the words are used interchangeably in this document) are possible.

Figure 6:
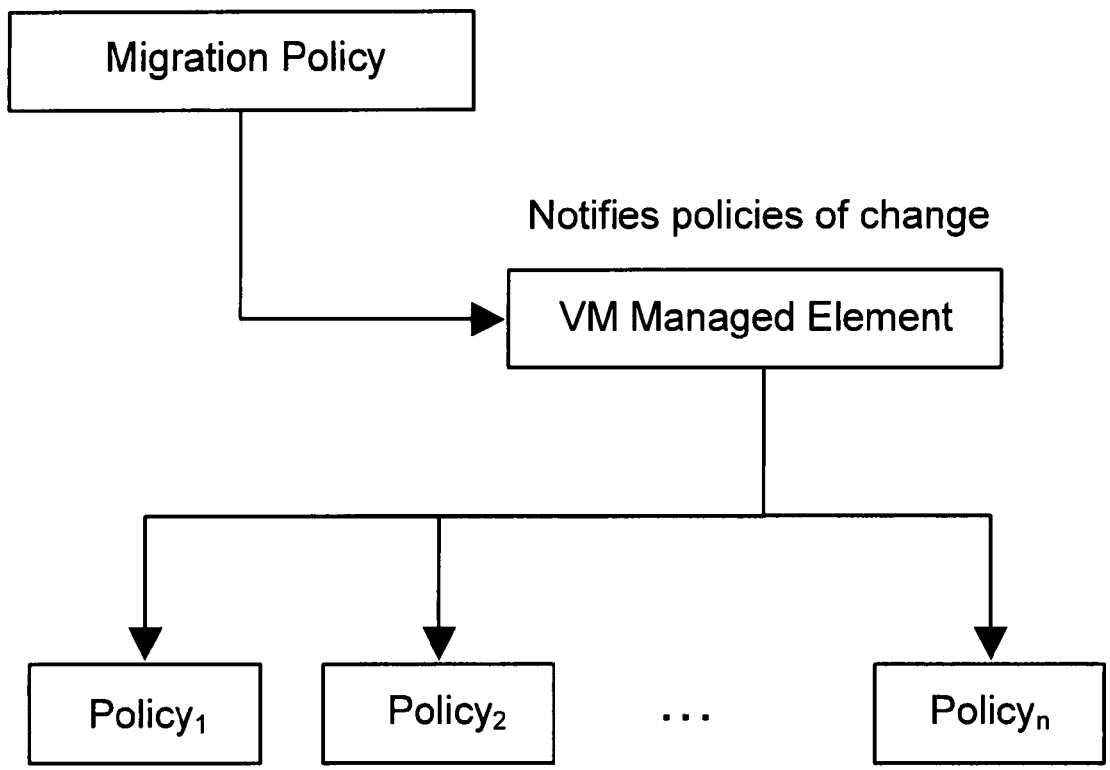
FIG. 6 shows the interaction between a policy that is involved in the migration of a virtual machine and the policies that manage that virtual machine.
Figure 7:
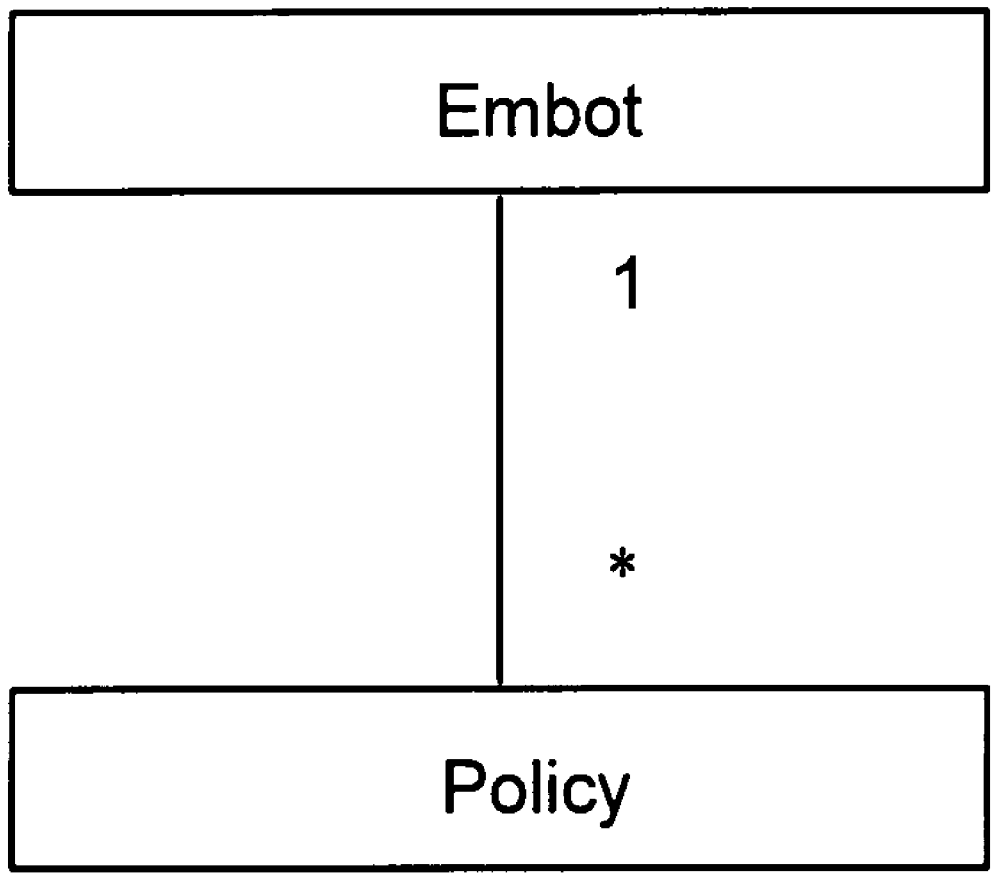
FIG. 7 shows the one-to-many relationship that exists between an embot and the policies that effect autonomic management.
Figure 8:
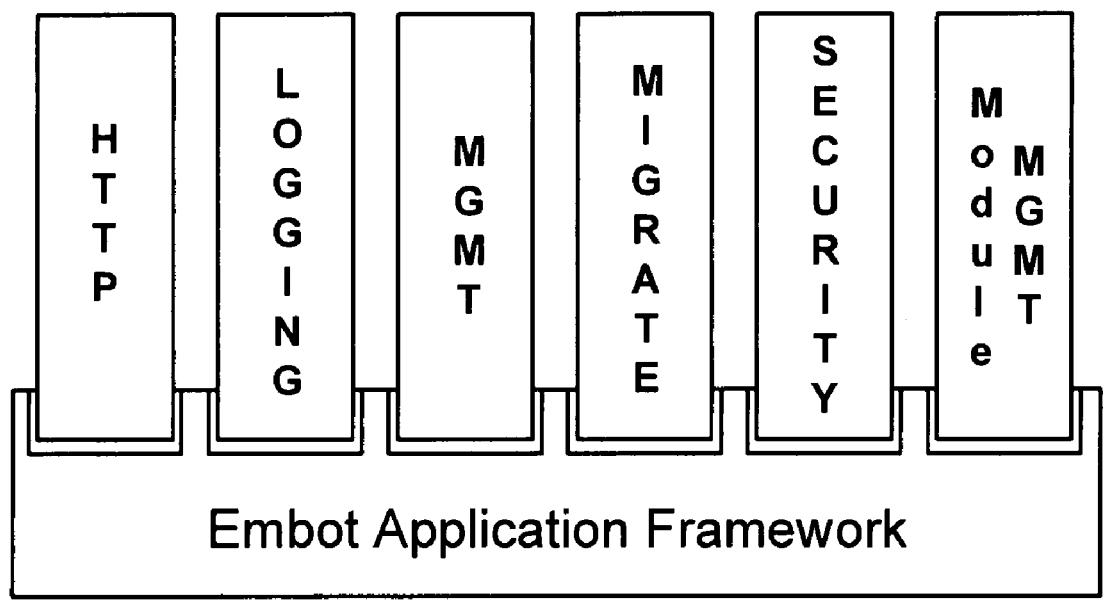

As shown in FIG. 6, the notified policies contact their embot containers indicating that migration should occur. One embot can store or contain one or more policies as shown by the one-to-many mapping on FIG. 7 along with managed elements representing the resources being managed in the service plane(s). Embot containers include behavior that support movement of manageability from one management plane to another, including the ability to move both code and state. A service for moving code and data provided as part of a mobile code infrastructure may be used by the affected embots to schedule themselves for migration. FIG. 8 provides a view of the plug-in nature of the infrastructure that can be used to support migration.

A typical scenario that provides an example of the utility of VM migration for achieving load distribution is provided next.

1. In this scenario there are two service planes running on domain 1 and domain 2 of a system as virtual machines.
2. A virtual machine managed element (VMManagedElement) has been created for each virtual machine. VMManagedElements are instantiated within the management plane, i.e. domain 0.
3. A migration policy that has a sensor which monitors the overall CPU utilization for the host is loaded.
4. The migration policy polls the CPU utilization sensor for percentage load data.
5. The migration policy consolidates the data into a moving average over a user-defined window, e.g. 15 minutes.
6. The average value is tested and if found to exceed a user-defined threshold, e.g., 80%, the migrateVM Application Programming Interface (API) on the VMManagedElementHome object is invoked.
7. The VMManagedElementHome object is responsible for managing the lifecycle of all VMManagedElement objects. In this scenario two objects exist. The first VMManagedElement object found has its migrate API invoked. The migrate API executes the method that is presented in FIG. 9 and is described in the next paragraph. Should the migrate API throw an exception it is handled within the VMManagedElementHome object. In one embodiment a log is generated. Once the exception is handled, it is thrown again and handled within the migration policy.

The method for the VM migration is explained with the help of flowcharts 900-1200 that are captured in FIGS. 9 to 12. The service VM including the VM managed element as well as the VM managing element for this service VM are migrated from a source host to a target host. Note that both the managed element as well as its manageability units are objects of migration. The steps of the methods illustrated in FIGS. 9 to 12 are executed on the source host.

Figure 9:
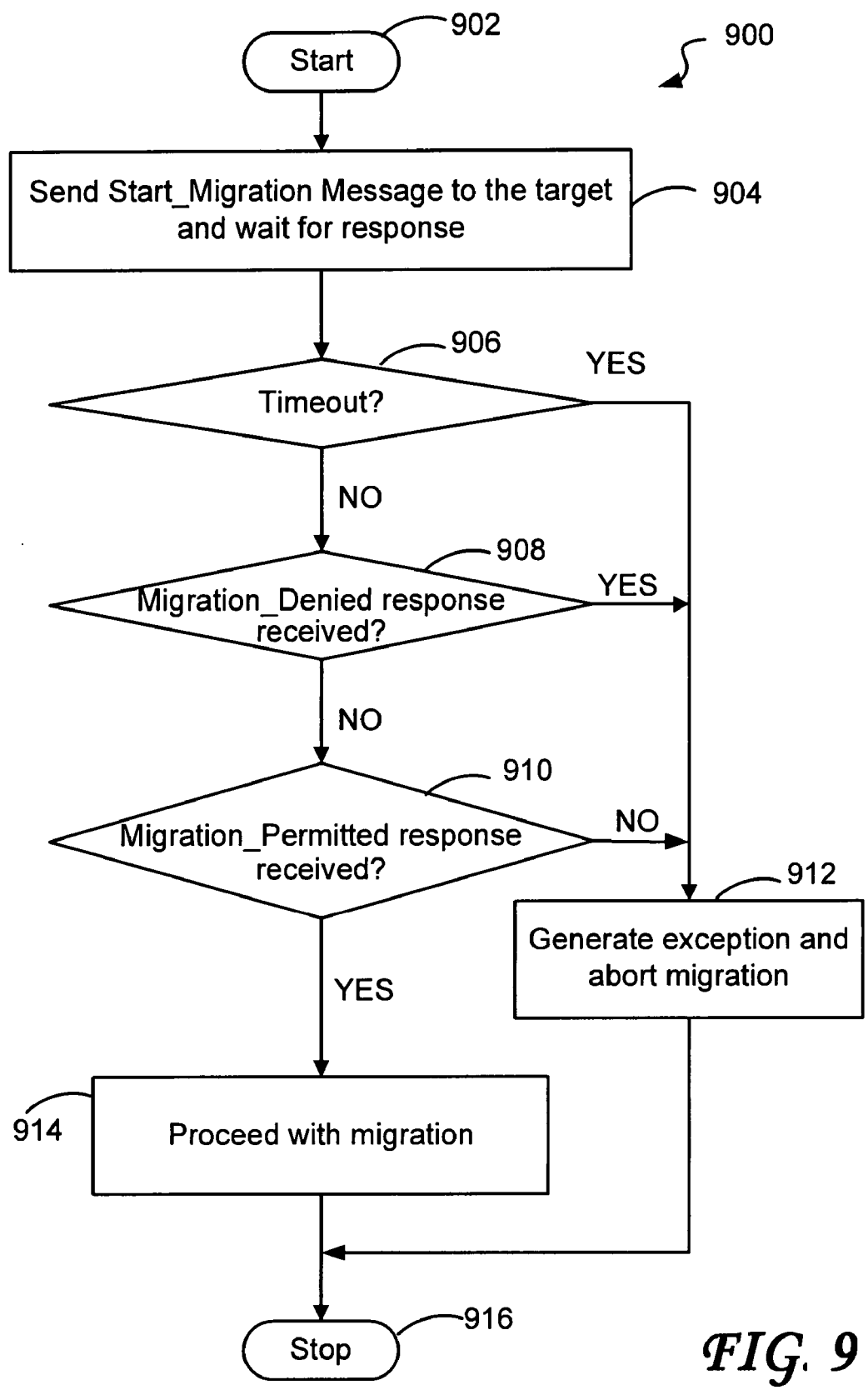
FIG. 9 presents the flowchart that illustrates the steps of the method for virtual machine migration.

FIG. 9 is explained in detail below. Upon start (box 902) the source host on which the VM to be migrated is currently deployed sends a Start_Migration message to the target host where the VM is to be migrated (box 904). After sending the message the source host waits for a response from the target host (box 906). If the response is not received before the occurrence of a timeout, the procedure exits 'YES' from box 906, generates an exception, aborts the migration (box 912) and exits (box 916). Note that when a migration is aborted the source host sends an Abort_Migration message to the destination host. If the response arrives before the occurrence of the timeout, the procedure exits 'NO' from box 906 and checks whether the Migration_Denied response that signifies the inability of the target to accept the migrating VM is received (box 908). If such a response is received the procedure exits 'YES' from box 908, generates an exception, aborts the migration (box 912) and exits (box 916). If the response is not Migration_Denied, the procedure checks whether a Migration_Permitted response is received (box 910). If such a response that signifies the ability of the target host to accept the migrating VM is not received, the procedure exits 'NO' from box 910, generates an exception, aborts the migration (box 912) and exits (box 916). On the other hand if a Migration_permitted response is received the procedure proceeds with the migration (box 914) and exits (box 916).

Figure 10A:
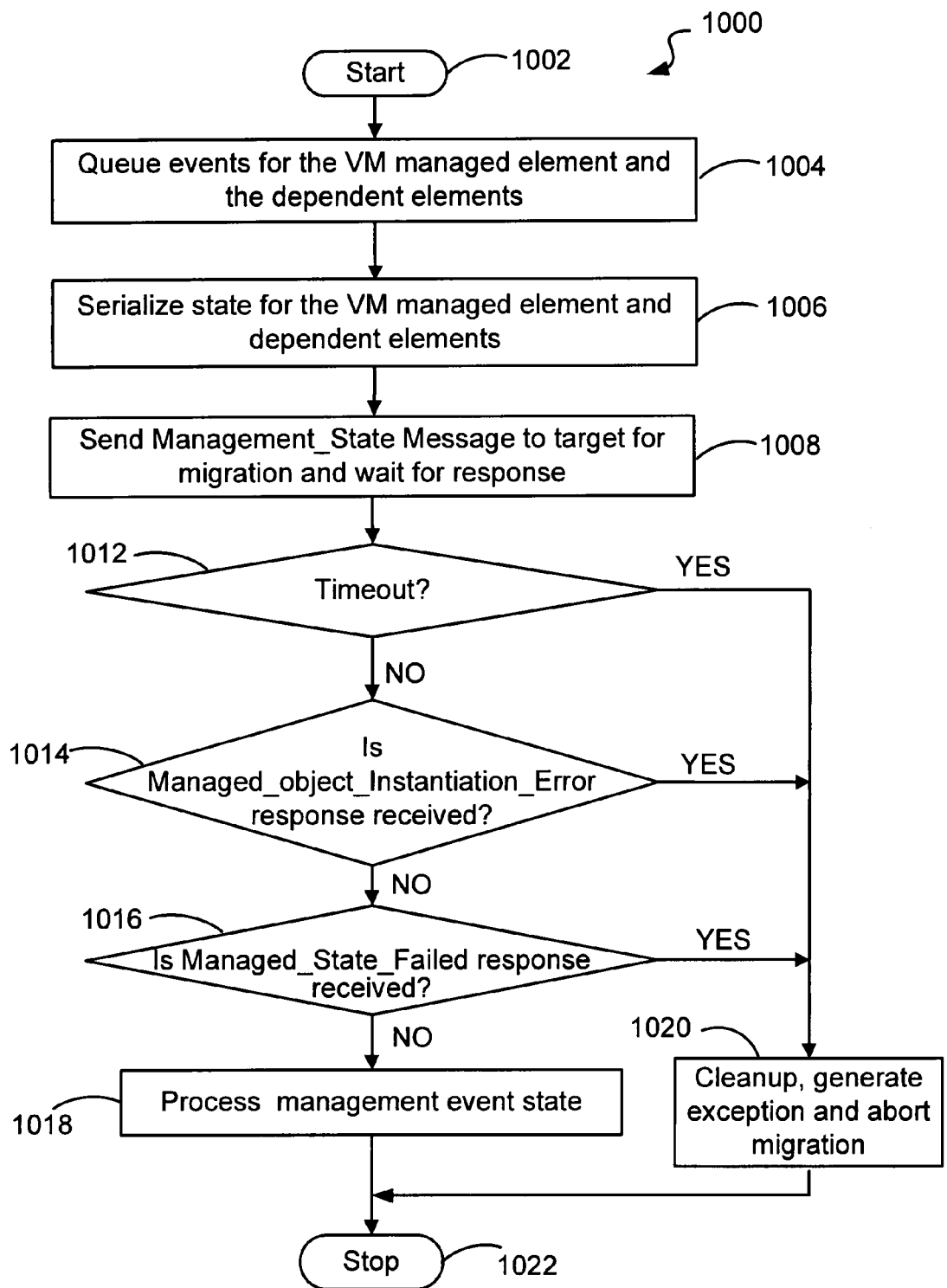
FIG. 10a presents the flowchart that illustrates the steps of the method for the procedure "Proceed with Migration" used in the flowchart of FIG. 9.
Figure 106:
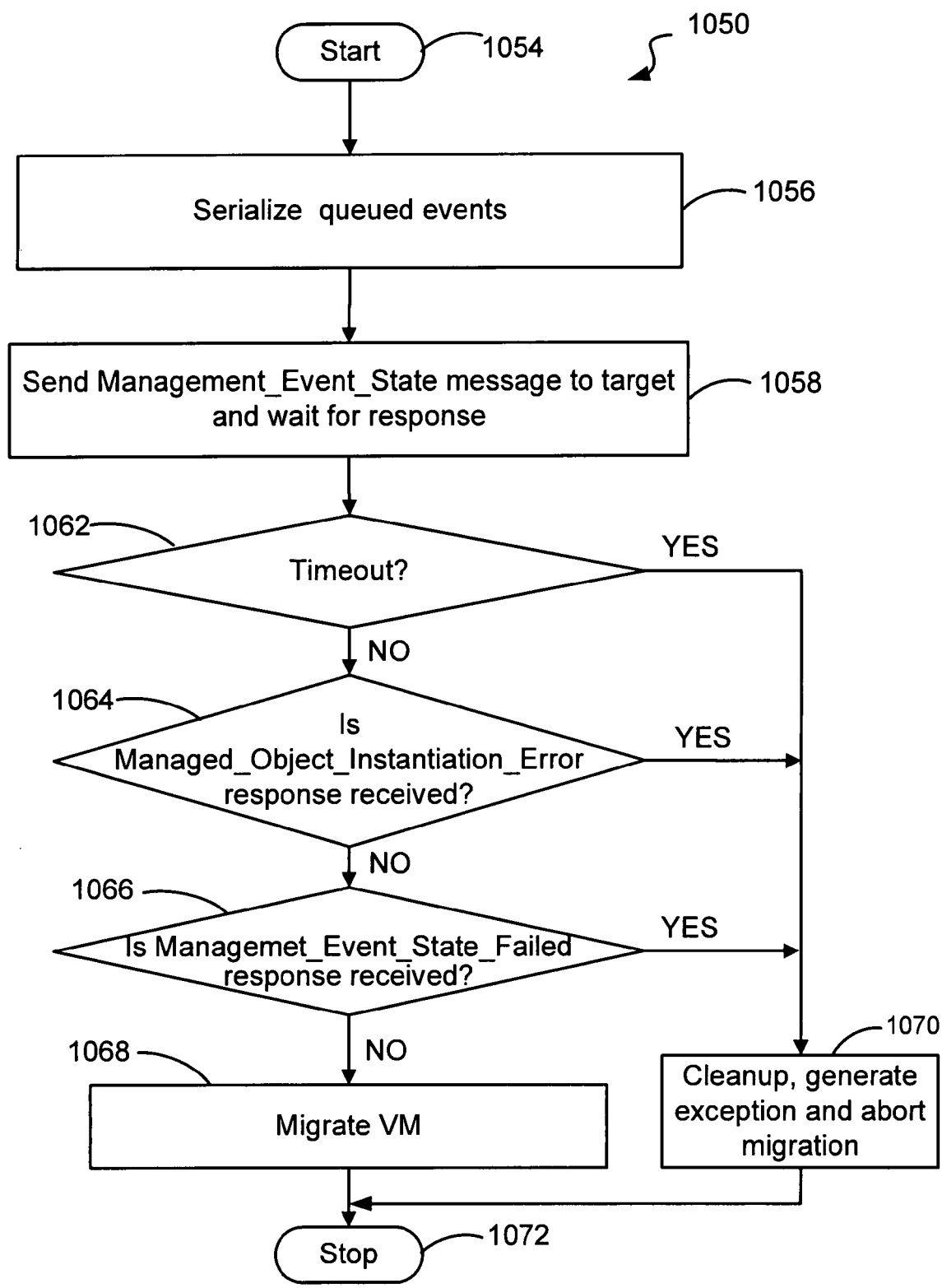

The step of Proceed Migration (box 916) is explained with the help of the flowchart shown in FIG. 10a. Upon start (box 1002), the procedure queues the events to be processed by the service VM. These include events for the VM managed element as well as for its dependant elements (box 1004). Instead of letting the events be processed the events are queued because the VM responsible for processing the events is being migrated to a different host. The procedure then serializes the state for the VM managed elements and its dependent elements for building a message (1006). This message containing the management state that includes the current state of the VM managed element and the state of its dependant elements is sent to the target host and the source host waits for a response (box 1008). If a timeout occurs before the arrival of a response, the procedure exits 'YES' from box 1012, cleans up the system memory, generates an exception, aborts the migration (box 1020) and exits (box 1022). If the response arrives before the timeout occurs, the procedure exits 'NO' from box 1012, and checks whether a Managed_Object-Instantiation_Error response is received (box 1014). If such a response is received, it means that the target host was unable to instantiate the desired management objects and the procedure exits 'YES' from box 1014, cleans up the system memory, generates an exception, aborts the migration (box 1020) and exits (box 1022). If such a response is not received, the procedure exits 'NO' from box 1014 and checks whether a Managed_State_Failed response message is received (box 1016). If such a message is received, the procedure exits 'YES' from box 1016, cleans up the system memory, generates an exception, aborts the migration (box 1020) and exits (box 1022). If such a message is not received it means that a message signifying the ability of the target host to continue with the migration is received; the procedure exits 'NO' from box 1016 and proceeds to process the management event state (box 1018) and exits (box 1022).

The step of Process management event state (box 1018) is explained further with the help of the flowchart presented in FIG. 10b. The role of this procedure is to transfer the queued events from the source host for processing at the target host once the VM migration is completed. Upon start (box 1054), the procedure serializes the queued events for building a message (1056). This message containing the management event state that corresponds to the state of the queued events is then sent to the target host and the source host waits for a response (box 1058). If a timeout occurs before the arrival of a response, the procedure exits 'YES' from box 1062, cleans up the system memory, generates an exception, aborts the migration (box 1070) and exits (box 1072). If the response arrives before the timeout occurs, the procedure exits 'NO' from box 1062 and checks whether a Managed_Object-Instantiation_Error response is received (box 1064). If such a response is received, it means that the target host was unable to instantiate the desired object, and the procedure exits 'YES' from box 1064, cleans up the system memory, generates an exception, aborts the migration (box 1070) and exits (box 1072). If such a response is not received, the procedure exits 'NO' from box 1064 and checks whether a Managed_Event_State_Failed response message is received (1066). If such a message is received, the procedure exits 'YES' from box 1066, cleans up the system memory, generates an exception, aborts the migration (box 1070) and exits (box 1072). If such a message is not received it means that a message signifying the ability of the target host to continue with the migration is received as response; the procedure proceeds to migrate the VM (box 1068) and exits (box 1072).

Figure 11:
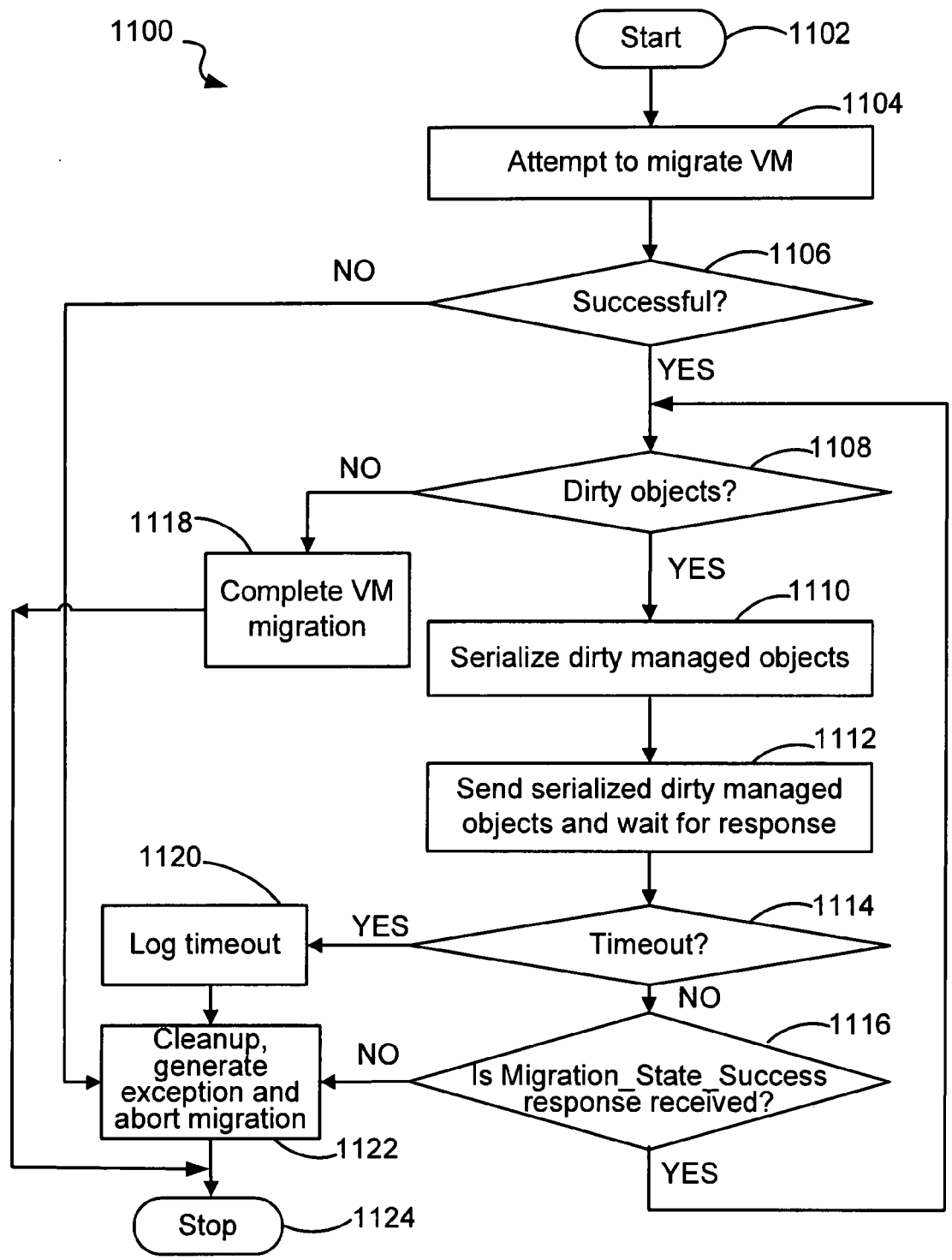
FIG. 11 presents the flowchart that illustrates the steps of the method for the procedure "Migrate VM" used in the in the flowchart of FIG. 10b.

The step of Migrate VM (box 1068) in the flowchart of FIG. 10b is explained further with the help of the flowchart presented in FIG. 11. Upon start (box 1102), the procedure attempts to migrate the VM from the source host to the destination host. If the attempt is not successful, the procedure exits 'NO' from box 1106, cleans up the system memory, generates an exception, aborts the migration (box 1122) and exits (box 1124). If the migration attempt is successful, the procedure exits 'YES' from box 1106 and checks if there are dirty objects for the VM to be migrated (box 1108). Note that since the VM being migrated is still in operation on the source host, some of the objects may change (become dirty) after the migration attempt is started. These objects include the components of the VM managed element that have changed. These dirty objects thus need to be transferred to the target host where the VM is designated to execute. If there are no dirty objects the procedure exits 'NO' from box 1108, completes the VM migration (box 1118) and exits (box 1124). If dirty objects exist, the procedure exits 'YES' from box 1108 and serializes these dirty managed objects and prepares a message (box 1110). The message containing the serialized dirty managed objects are then sent to the target host and the procedure waits for a response (box 1112). If a timeout occurs before the arrival of a response, the procedure exits 'YES' from box 1114, logs the occurrence of the timeout (box 1120), cleans up the system memory, generates an exception, aborts the migration (box 1122) and exits (box 1124). If a response is received before the occurrence of the timeout, the procedure exits 'NO' from box 1114 and checks whether a Migration_State_Success response is received. If such a response is received it means that the dirty managed objects sent are successfully deployed at the target host and the procedure exits 'YES' from box 1116 and loops back to the entry of box 1108 to check if new dirty objects have been created. If the response received is not Migration_State_Success, it means that the target host is unable to continue with the migration; the procedure exits 'NO' from box 1116, cleans up the system memory, generates an exception, aborts the migration (box 1122) and exits (box 1124).

Figure 12:
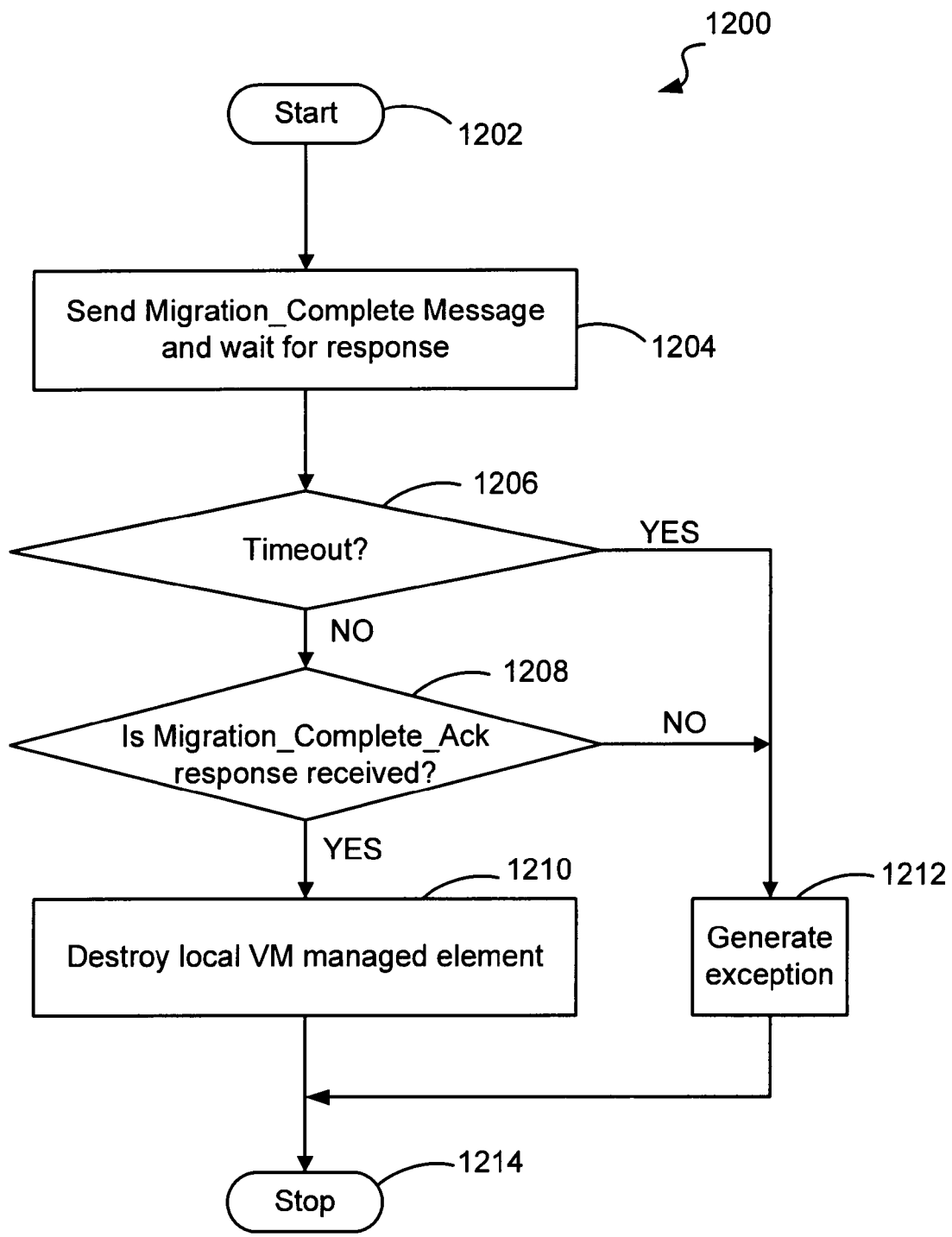
FIG. 12 presents the flowchart that illustrates the steps of the method for the procedure "Complete VM Migration" used in the in the flowchart of FIG. 11.

The step of Complete VM migration (box 1118) in the flowchart of FIG. 11 is explained with the help of the flowchart presented in FIG. 12. Upon start (box 1202), the procedure sends a Migration_Complete Message that indicates the completion of the VM migration to the target host and waits for a response (box 1204). If a timeout occurs before the response is received, the procedure exits 'YES' from box 1206, generates an exception (box 1212) and exits (box 1214). If the response is received before the occurrence of the timeout, the procedure exits 'NO' from box 1206 and checks whether a Migration_Complete_Ack that indicates that the migration is successfully completed is received. If such a response is not received, the procedure exits 'NO' from box 1208, generates an exception (box 1212) and exits (box 1214). If the Migration_Complete_Ack response is received, the procedure exits 'YES' from box 1208, terminates the service VM and the VM managing element at the source host (box 1210) and exits (box 1214). The migration of the service VM is now complete and the execution of the service VM and the VM managing element are resumed on the target host.

Figure 13:
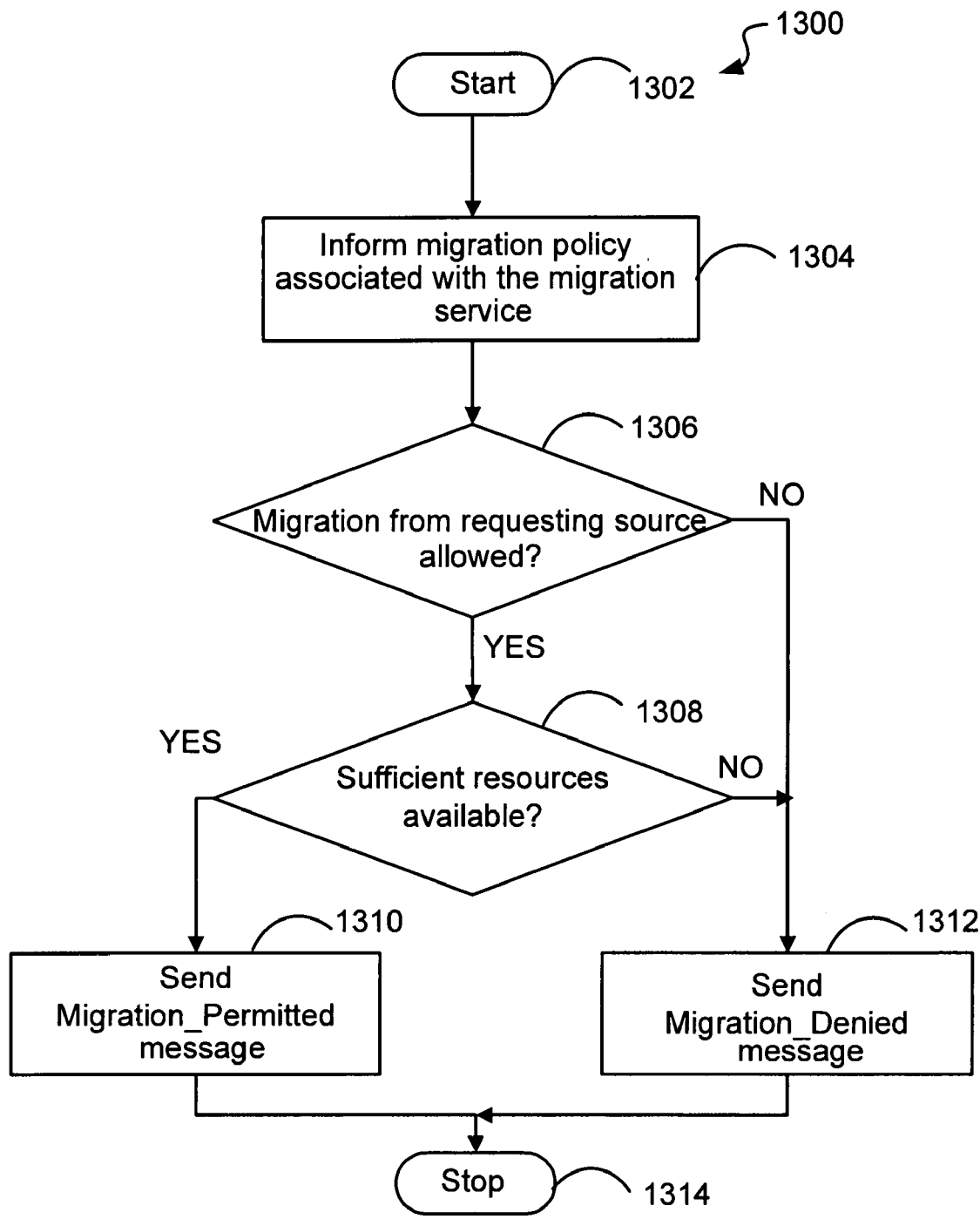
FIG. 13 presents the flowchart that illustrates the steps of the method for the procedure that is executed on the target host in response to the "Start_Migration" message sent from the source host in box 904 of FIG. 9.

A number of steps of the procedures described in the context of the flowcharts presented in the previous paragraph is further discussed. The steps of the procedure that are executed on the target host in response to the Start_Migration message sent from the source host in box 904 of FIG. 9, is explained with the help of the flowchart 1300 presented in FIG. 13. The procedure executed on the target host allows the target management plane to decide whether to accept the migrating virtual machine. A migration policy associated with the migration service on the target management plane is used to process the message. Upon start (box 1302) the migration policy associated with the migration service is notified of the migration request from the source host (box 1304). This request includes the location of the source of the request (either IP address or full qualified domain name). The policy checks to see if migration from the requesting source is allowed (box 1306). If such a migration is not allowed, the procedure exits 'NO' from box 1306, sends a Migration_Denied message to the source host (box 1312) and exits (box 1314). If the migration is allowed, the procedure exits 'YES' from box 1306 and checks to see if sufficient resources are available to run the migrating virtual machine on the target host (box 1308). If not, the procedure exits 'NO' from box 1308, sends a Migration_Denied message to the source host (box 1312) and exits (box 1314). If sufficient resources are available, the procedure exits 'YES' from box 1308, returns a Migration_Permitted message to the source host (box 1310) and exits (box 1314).

Figure 14:
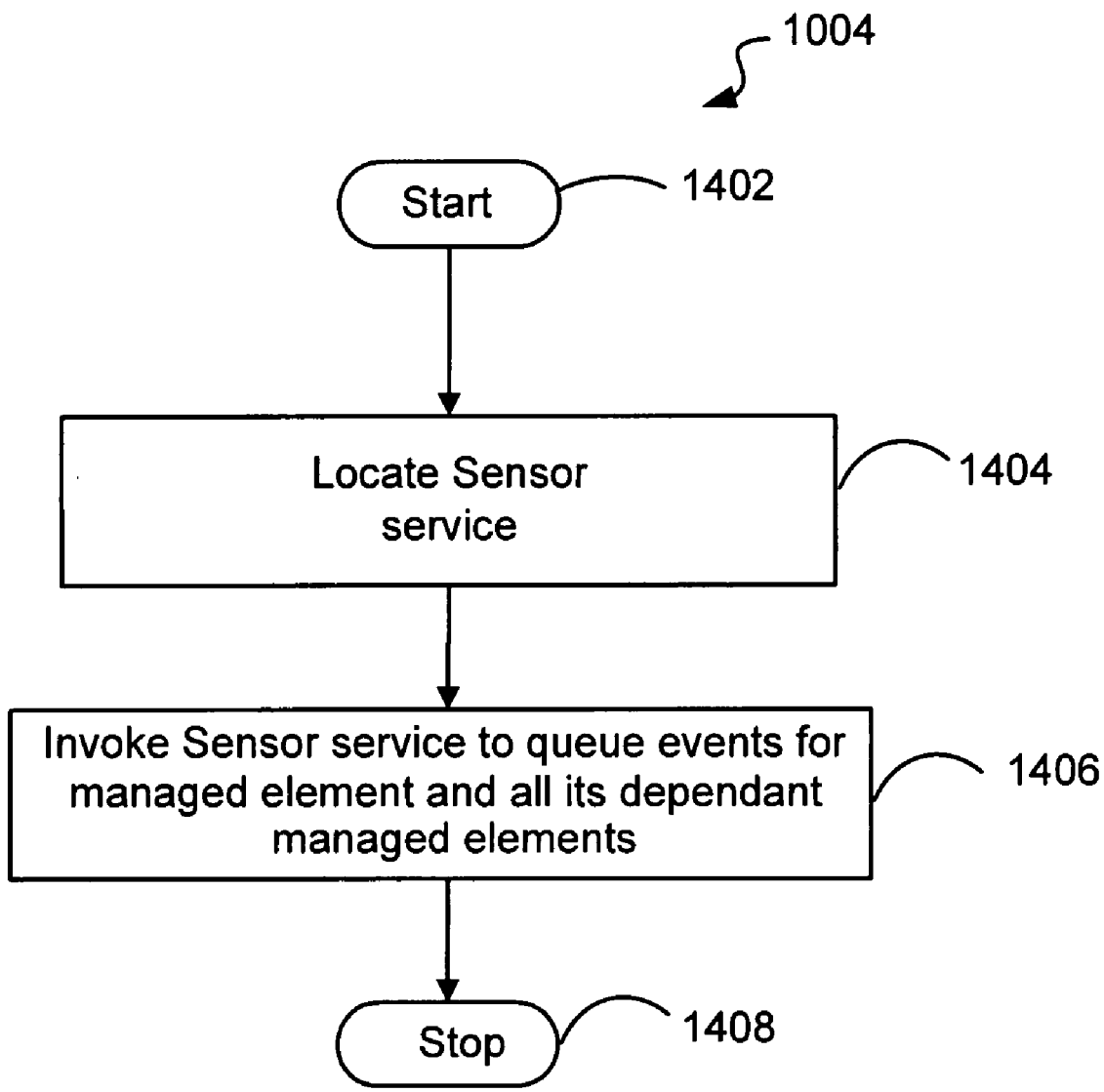

Executed on the source host, the steps of the procedure used in box 1004 in FIG. 10, is explained further with the help of the flowchart presented in FIG. 14. The procedure starts the process of queueing events for the managed elements that are being migrated to the target management plane. Upon start (box 1402), the Sensor service is located using the service registry provided by Embotics Application Framework (EAF) (box 1404). In the next step, a queue of events is created within the Sensor service such that no further events are forwarded to the VM managed element (box 1406); they are simply queued pending reactivation of event forwarding. A similar queue of events is also created for each dependent element of this VM managed element. After completing this step, the procedure exits (box 1408).

Figure 15:
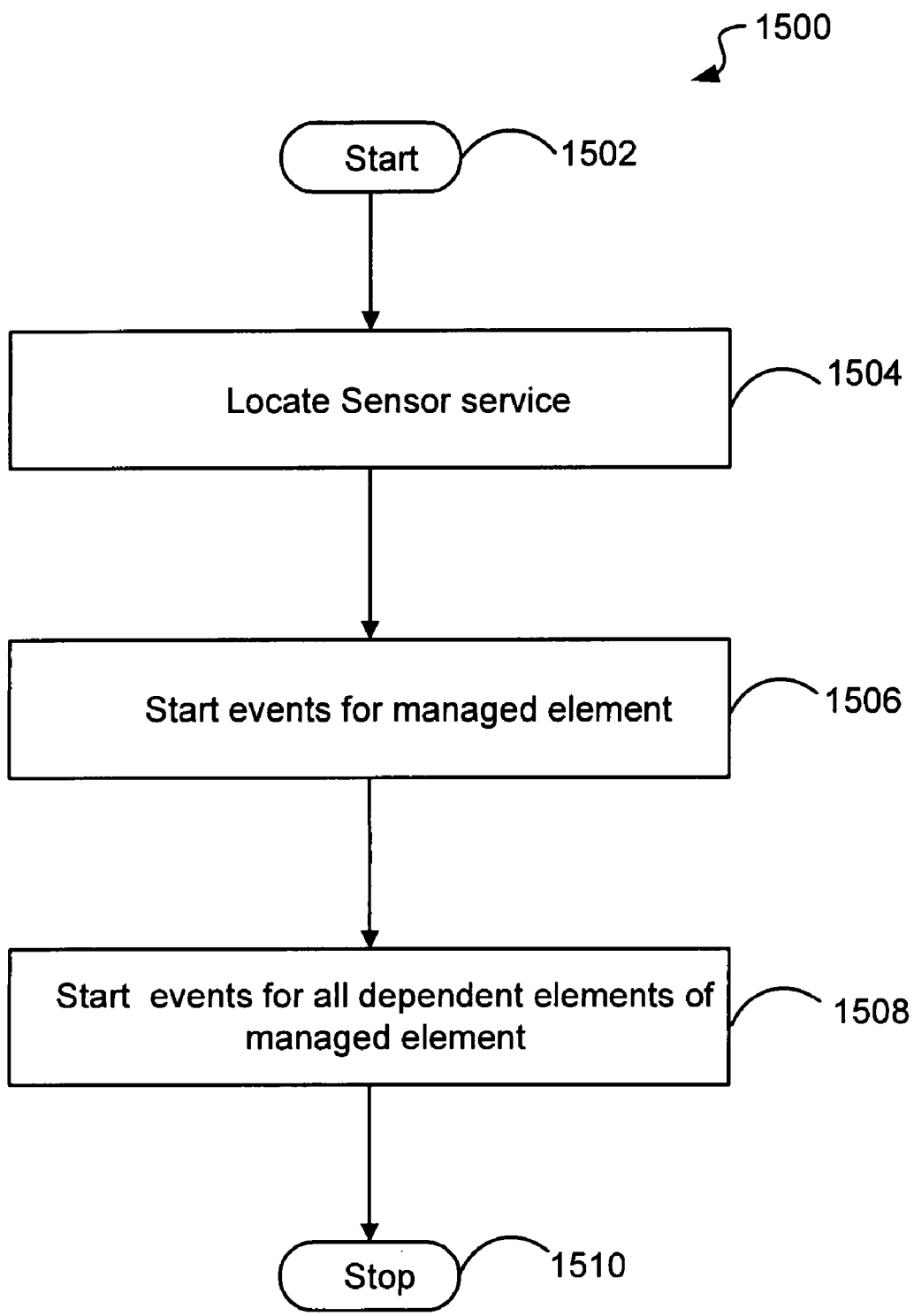
FIG. 15 presents the flowchart that illustrates the steps of the method for the procedure executed on the source or the destination host when it is required to re-start the process of dispatching events to managed elements.

Executed on the source or the destination host, the steps of the procedure displayed in the flowchart 1500 in FIG. 15 are executed when it is required to re-start the process of dispatching events to managed elements. The queue of events is destroyed once messages are processed by the managed elements. Upon start (box 1502), the Sensor service is located using the service registry provided by EAF (box 1504). Events for the VM managed element are then started by adding the queue of events created within the Sensor service for the VM managed element to a time-ordered queue of events stored within the Sensor service (box 1506). The queue associated with the VM managed element is destroyed. In the next step, events for each dependent element of the VM managed element are started in a similar way (box 1508) after which the procedure exits (box 1510).

Figure 16:
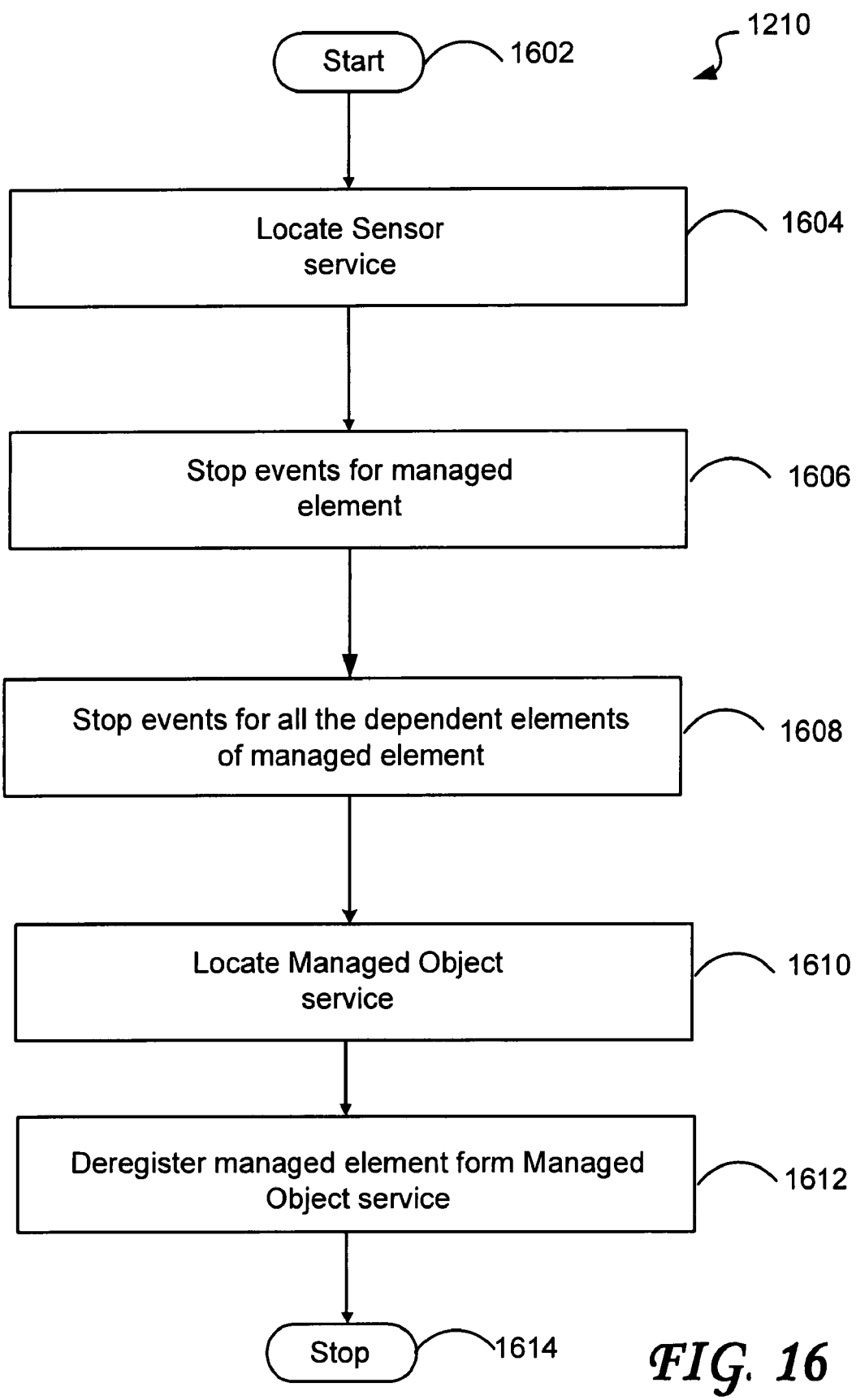
FIG. 16 presents the flowchart that further explains the step of the method for "Destroy local VM managed element" captured in box 1210 of FIG. 12.

The step of the procedure captured in box 1210 of FIG. 12, is explained further with the help of the flowchart presented in FIG. 16. Executed on the source host, the procedure removes the event queues associated with the managed elements and deregisters the (now migrated) managed elements. Upon start (box 1602), the Sensor service is located using the service registry provided by EAF (box 1604). The next steps are to stop forwarding events to the VM managed element (box 1606) and all the dependent elements of the managed element (box 1608). The Managed Object service is located next using the service registry provided by EAF (box 1610). The procedure then deregisters the VM managed element from the Managed Object service (box 1612) and exits (box 1614).

Figure 17:
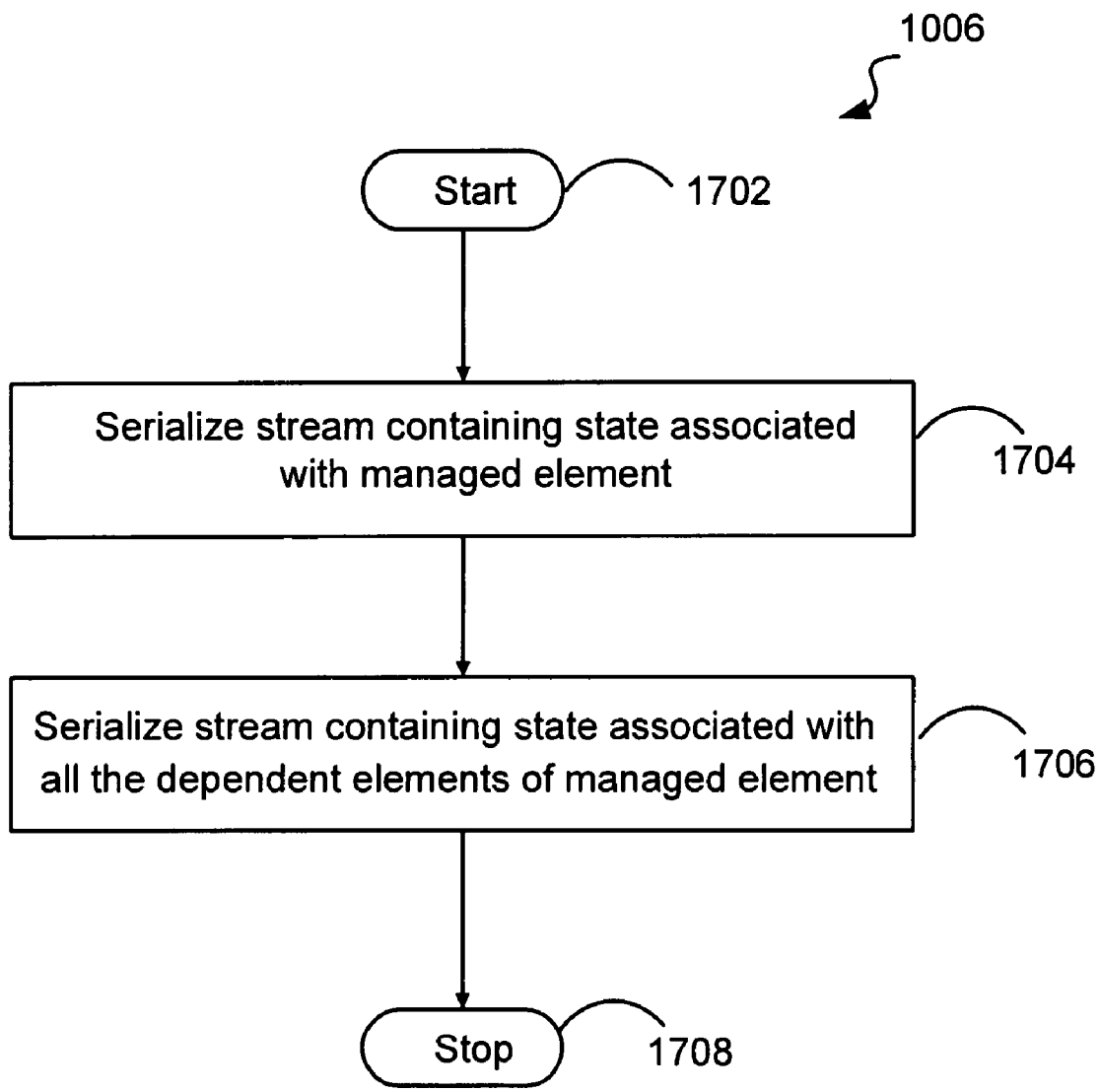

The step of the procedure captured in box 1006 of FIG. 10a, is explained further with the help of the flowchart presented in FIG. 17. Executed on the source host, this procedure serializes state associated with the VM managed element and all of its dependent elements. Upon start (box 1702), the stream containing the state associated with the managed element is serialized for transmission to the target host (box 1704). The procedure then serializes the stream associated with each dependent element of the managed element (box 1706) and exits (box 1708).

Figure 18:
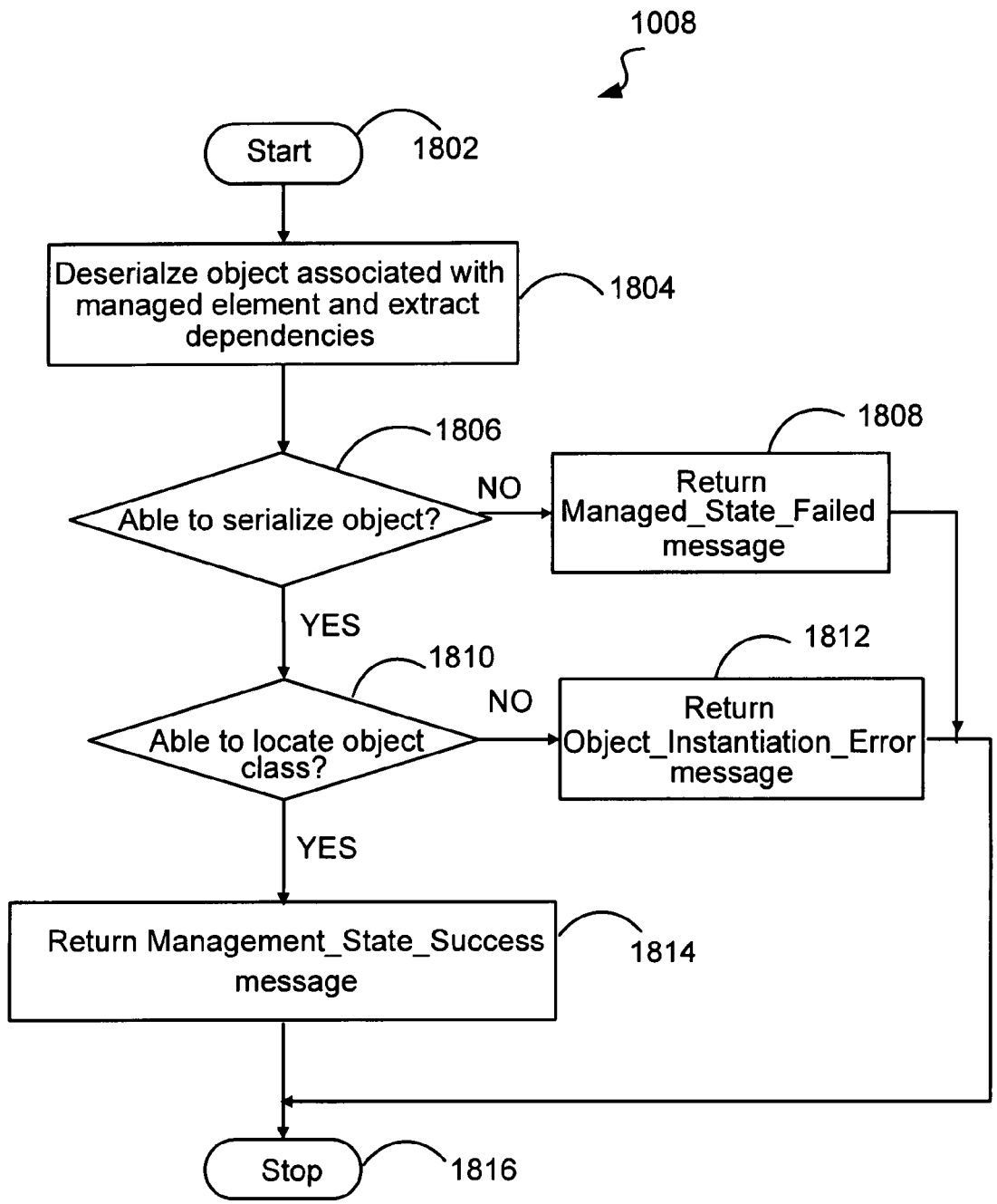

The step of the procedure captured in box 1008 of FIG. 10a, is explained further with the help of the flowchart presented in FIG. 18. Executed on the target host for processing the message sent by the source host this procedure deserializes the VM managed element state and all the dependant element states. Upon start (box 1802), the procedure deserializes the serialized objects associated with body of the message and recreates the dependencies among them (step 1804). Whether or not the deserialization was successful is checked next (box 1806). If the deserialization was not successful, the procedure exits 'NO' from box 1806, returns a Management_State_Failed message to the source host (box 1808) and exits (box 1816). If the deserialization was successful, the procedure exits 'YES' from box 1808 and checks whether or not the object classes can be located (box 1810). In the situation where classes are not resident locally, the source migration service is contacted in order to send the required classes. This process may be recursive dependent upon the class hierarchy represented in the managed objects. If unable to locate the object classes, the procedure exits 'NO' from box 1810, returns a Managed_Object Instantation_Error message to the source host (box 1812) and exits (box 1816). If all the object classes are located the procedure returns a Management_State_Success message to the source host (box 1814) and exits (box 1816).

Figure 19:
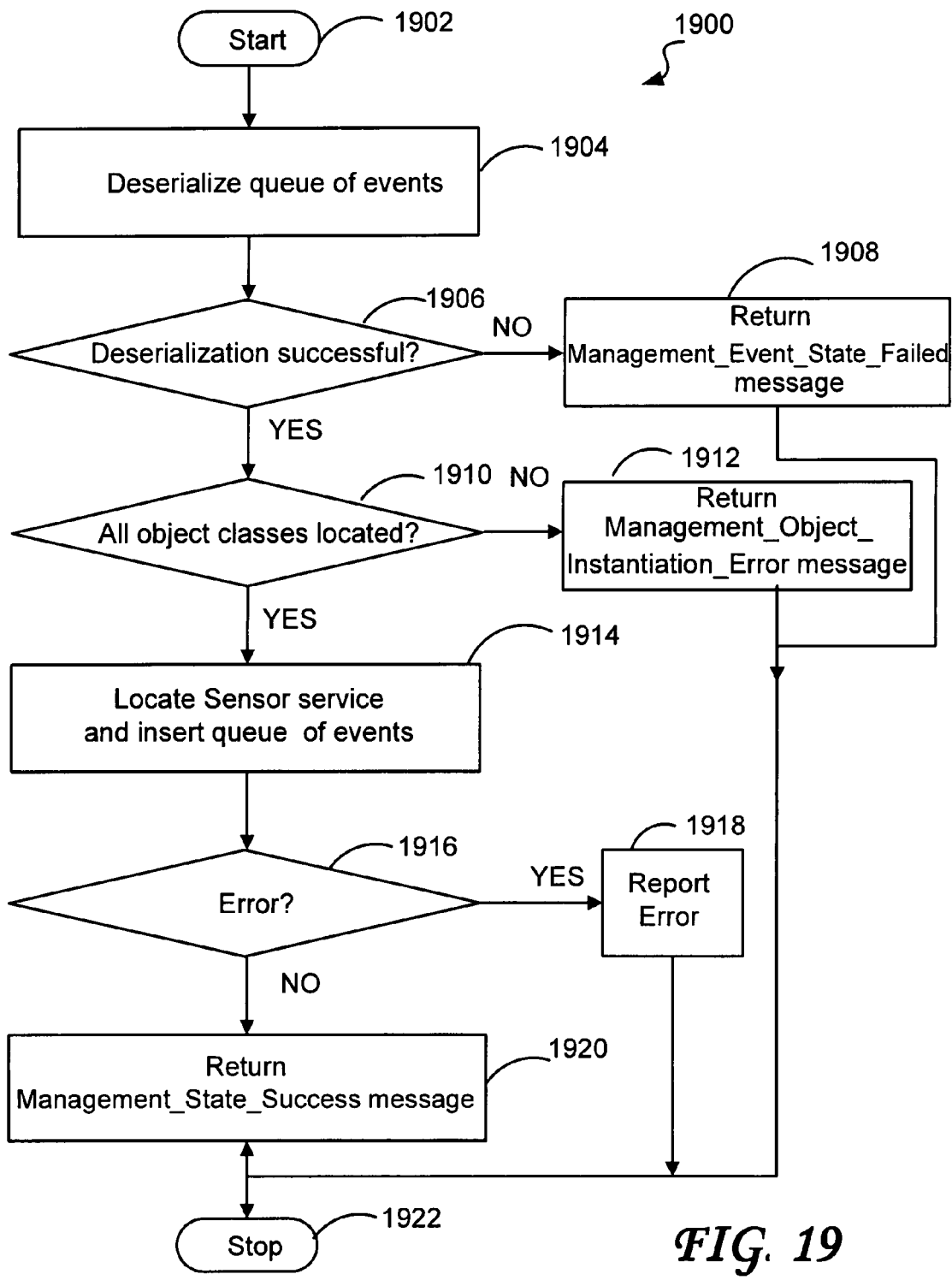
FIG. 19 presents the flowchart that explains the steps of the method for the procedure that is executed on the target host for processing the "Management_Event_State" message sent by the source host in box 1058 of FIG. 10b.

The steps of the procedure executed on the target host for processing the message sent by the source host in box 1058 of FIG. 10b, are explained with the help of flowchart 1900 displayed in FIG. 19. The procedure deserializes a queue of events containing information to be processed by the VM managed element and its dependant elements. Upon start (box 1902), the serialized queue of events associated with the body of the message is deserialized (box 1904). The next step is to check whether or not the deserialization was completed successfully (box 1906). If deserialization is not successful, the procedure exits 'NO' from box 1906, sends a Management_Event_State_Failed message to the source host (box 1908), and exits (box 1922). On the other hand, if deserialization is successful the procedure exits 'YES' from box 1906 and checks whether or not all objects can be located (box 1910). In the situation where classes are not resident locally, the source migration service is contacted in order to send the required classes. This process may be recursive dependent upon the class hierarchy represented in the managed object. If an object class cannot be located either locally or retrieved from the source migration service, the procedure exits 'NO' from box 1910, returns a Managed_Object Instantiation_Error message (box 1912) and exits (box 1924). Otherwise, the procedure exits 'YES' from box 1910 and locates the Sensor service, using the service registry provided by EAF (box 1914). The queue of event messages is then passed on to the Sensor service. Whether or not an error is generated is checked next (box 1916). If an error is generated the procedure exits 'YES' from box 1916, reports the error (box 1918) and exist (box 1922). If no errors have been detected the procedure exits 'NO' from box 1916, returns a Management_Event_State_Success message (box 1920) and exits (box 1922).

Figure 20:
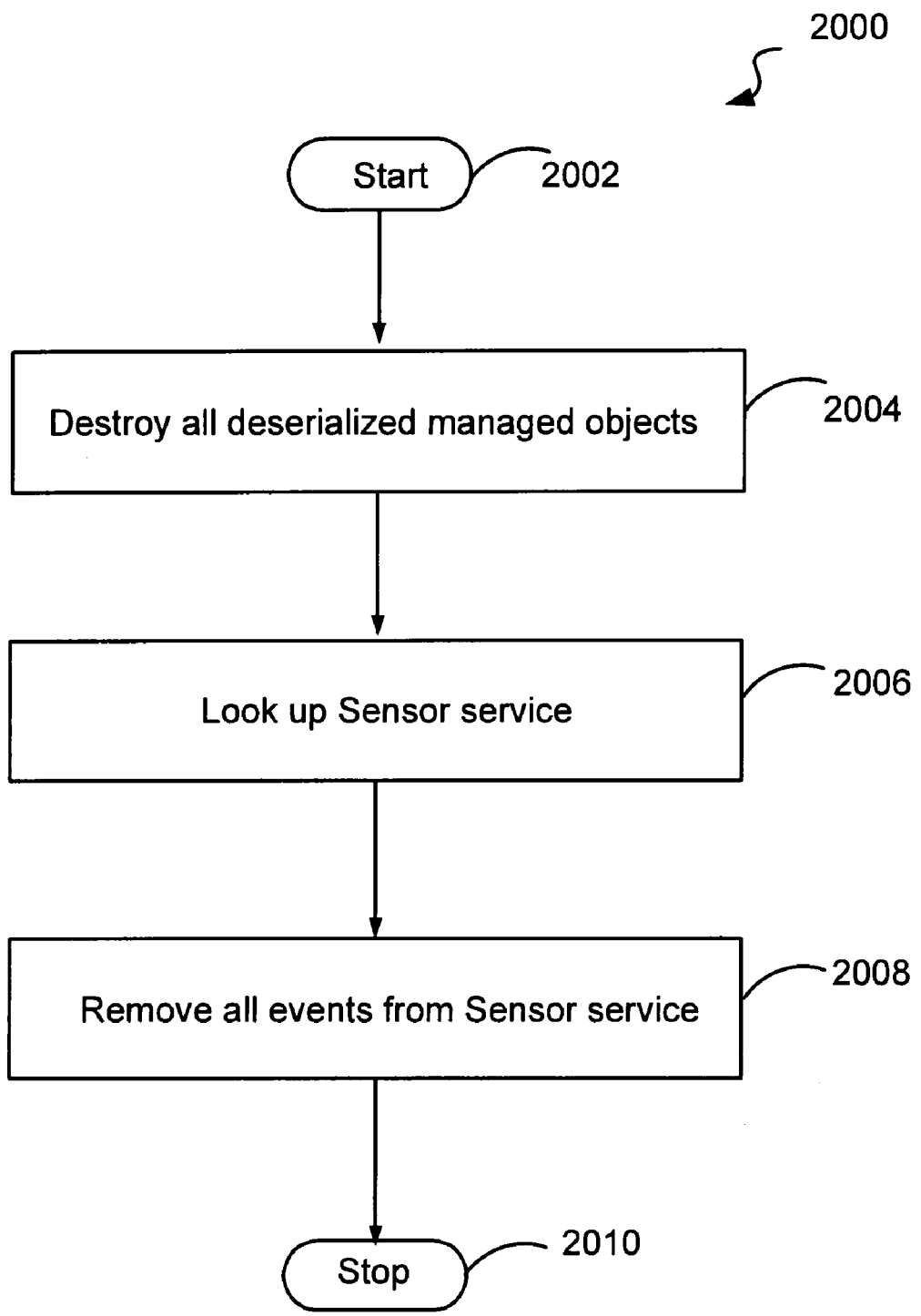
FIG. 20 presents the flowchart that explains the steps of the method for the procedure that is executed on the source host for aborting the migration when a timeout occurs or when an error message is received from the target host.

The procedure executed on the source host for dealing with aborting the migration when a timeout occurs or when an error message is received from the target host is explained with the help of flowchart 2000 presented in FIG. 20. Upon start (box 2002), all deserialized managed objects are destroyed (box 2004). The Sensor service is looked up next (box 2006). The procedure then removes all events from the Sensor service (box 2008) and exits (box 2010).

Figure 21:
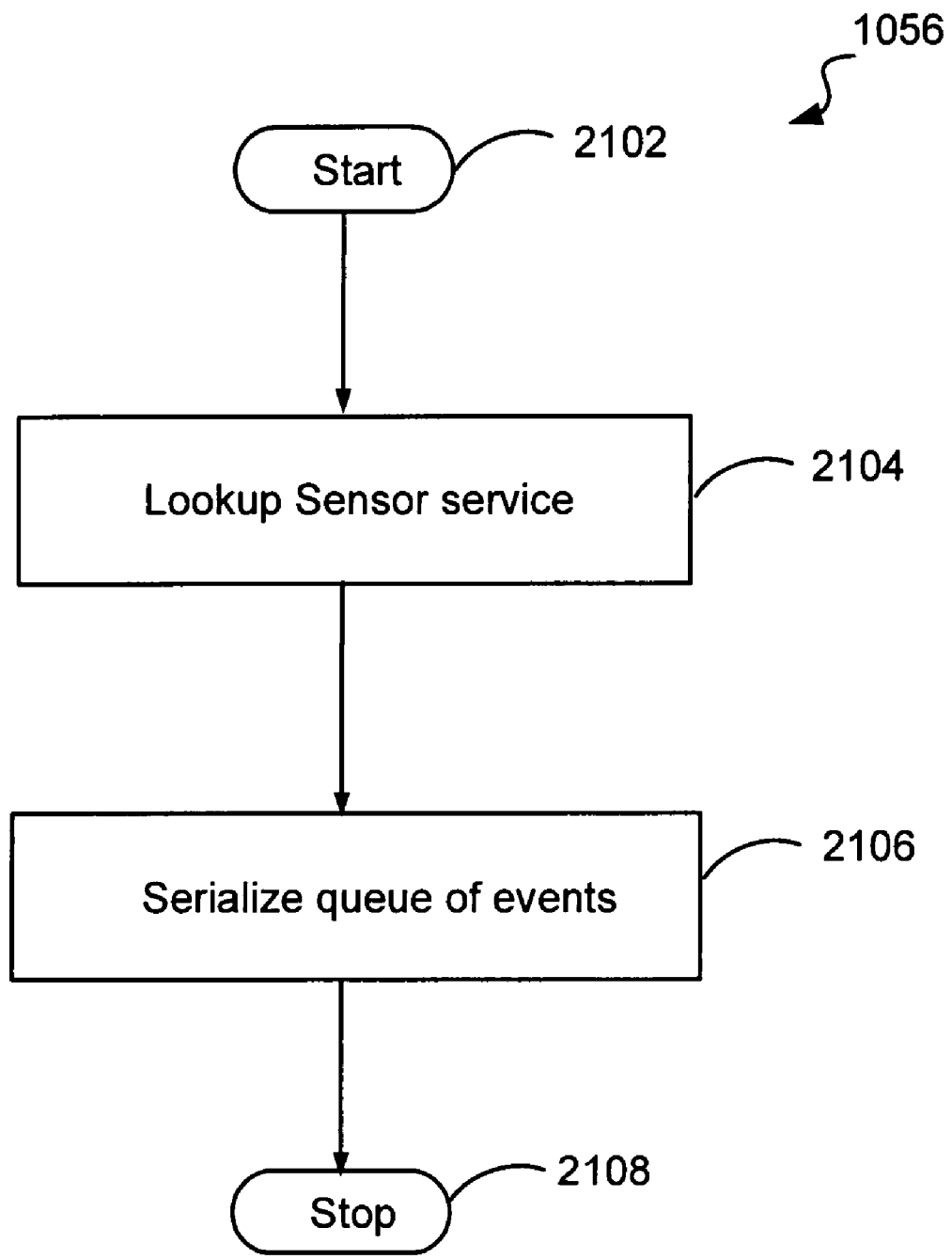
FIG. 21 presents the flowchart that further explains the step of the method for "Serialize queued events" captured in box 1056 of FIG. 10b.

The step of the procedure executed on the source host in box 1056 of FIG. 10*b*, is explained further with the help of the flowchart displayed in FIG. 21. The procedure serializes a queue of events containing information to be processed by the VM managed element and its dependent managed elements. Upon start (box 2102), the procedure looks up the Sensor service (box 2104). The procedure then serializes the queue of events, returns the resulting byte stream (box 2106) and exits (box 2108).

Figure 22:
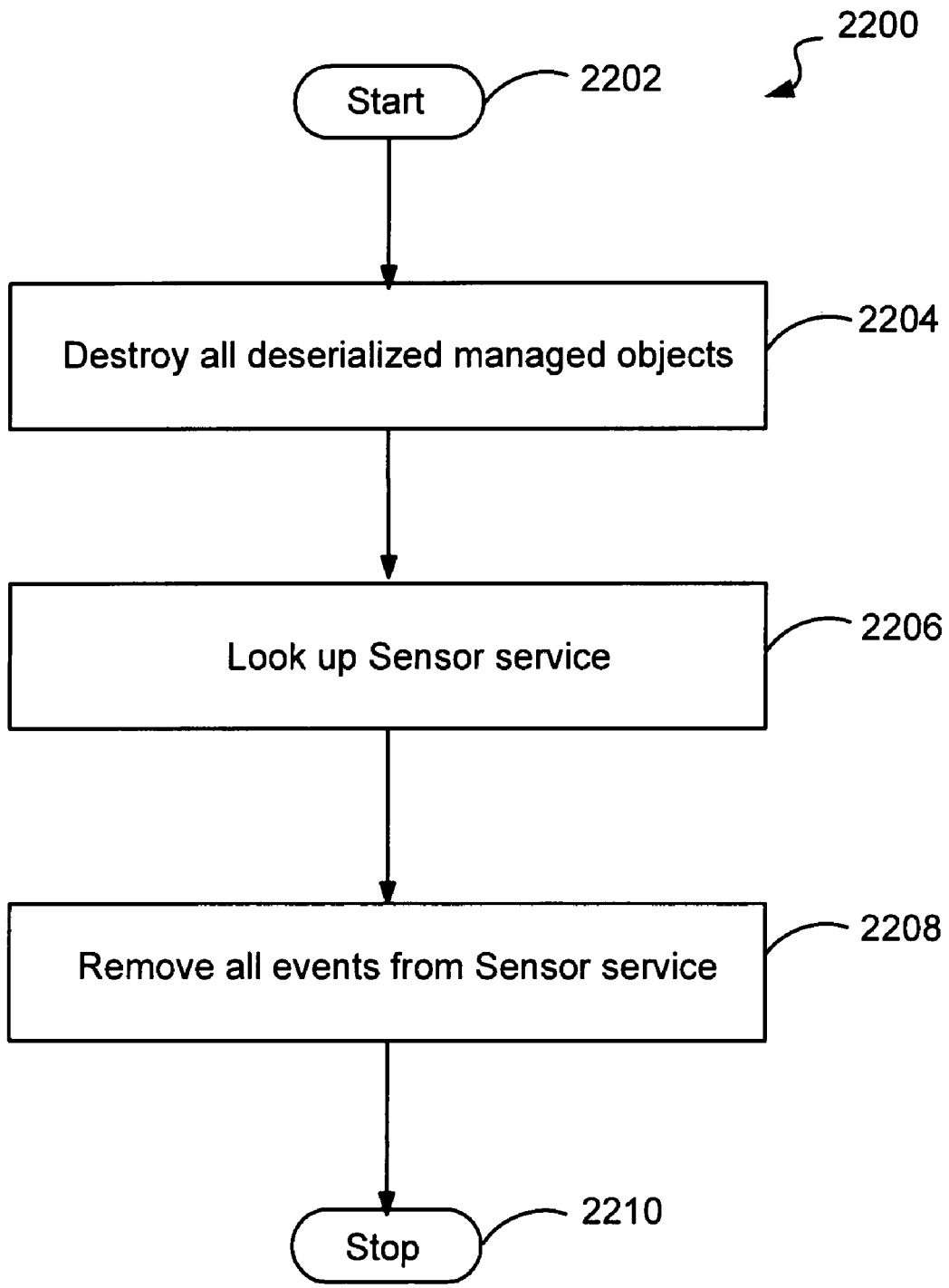
FIG. 22 presents the flowchart that explains the steps of the method for performing the cleaning up operations on the target management plane.

Executed on the target host, a procedure that is similar to the procedure presented in FIG. 20, is described with the help of flowchart 2200 presented in FIG. 22. It performs the cleaning up operations on the target management plane. Upon start (box 2202), all deserialized managed objects are destroyed (box 2204). The Sensor service is looked up next (box 2206). The procedure then removes all events from the Sensor service (box 2208) and exits (box 2210).

Figure 23:
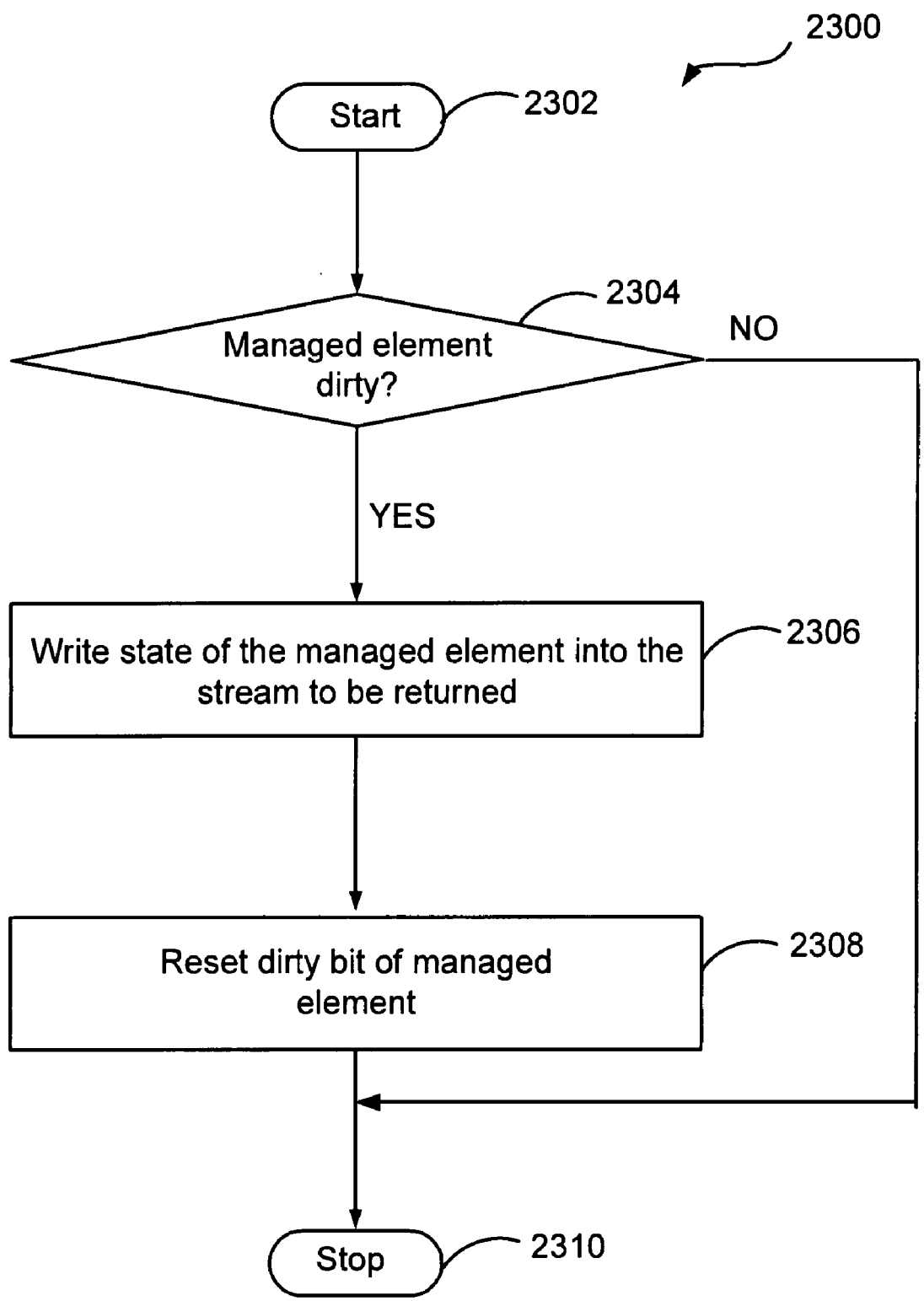
FIG. 23 presents the flowchart that explains the steps of the method executed on the source host for processing the changes that occur to managed elements during VM migration.

Executed on the source host, the procedure that processes changes that occur to the managed elements (as captured in box 1108 and box 1110 of FIG. 11) while the VM migration is in process is explained with flowchart 2300 presented in FIG. 23. While migration is in progress there is a potential for state to change—affected managed elements are then marked as dirty in this case. Access to the VM managed element is synchronized for the execution of the procedure captured in flowchart 2300. Upon start (box 2302), the procedure checks whether or not the managed element is dirty (box 2304). If the managed element is dirty, the procedure exits 'YES' from box 2304, writes the state of the managed element to the serialization stream to be returned (box 2306). The procedure then resets the dirty bit in the ManagedElement (box 2308) and exits (box 2310). If the managed element is not dirty, the procedure exits 'NO' from box 2304 and exits (box 2310). Note that this procedure is recursively invoked for dependents of the managed element.

Figure 24:
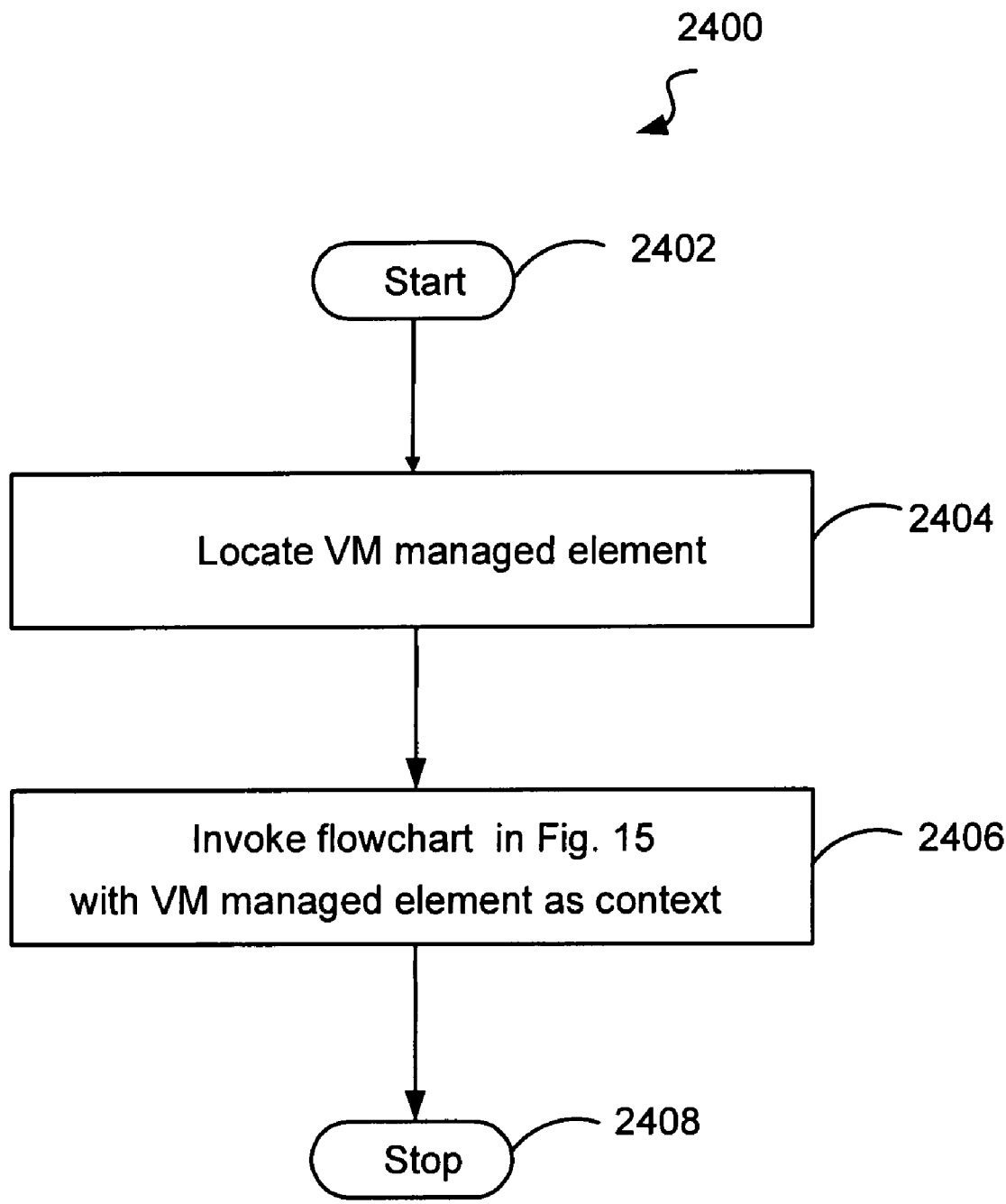
FIG. 24 presents the flowchart that explains the steps of the method executed on the target host for restarting the migrated VM on the target host after the reception of the "Migration_Complete" message sent from the source host in box 1204 of FIG. 12.

The steps of the method for the procedure executed on the target host in response to the Migration_Complete message sent from the source host in box 1204 of FIG. 12 is explained with the help of flowchart 2400 displayed in FIG. 24. The procedure is used to restart the migrated VM on the target host after the reception of the message. Upon start (box 2402), the VM managed element is located within the set of migrated managed objects (box 2404). Note that the migrated managed objects are already registered with the Sensor service for events and thus the VM managed element can be easily located. The procedure then invokes the procedure described in FIG. 15 with the VM managed element as context (box 2406) and exits (box 2408).

The embodiment of the present invention has the following features:
   Migration of an autonomic manager and the VM it manages;
   Management state preservation during migration;
   Lifecycle maintenance of management software in a virtualized environment; and
   Fault recovery of the management plane when migration of management components cannot be moved in conjunction with a migrated VM.

The embodiment of the invention has the following advantages:
   Improved system management through effective delegation;
   Results in reduced cost of ownership of system;
   Higher system availability;
   Management is delegated; management infrastructure responds dynamically to changes in service infrastructure;
   Ability to dynamically react to changes in the applications deployed on a system, e.g., if a new application is deployed, the system can automatically acquire and configure management functionality for it; and
   Provides a mechanism for coherent management of heterogeneous virtualized platforms, e.g., Windows and Linux operating systems.

The system used in the embodiment of this invention includes computing devices. A computing device has a memory for storing the program that performs the steps of the method for achieving VM migration.

Numerous modifications and variations of the present invention are possible in light of the above teachings. It is therefore to be understood that within the scope of the given system characteristics, the invention may be practiced otherwise than as specifically described herein.

What is claimed is:

1. A method for migrating a service Virtual Machine (VM), comprising an operating system and applications running on a hypervisor, comprising a VM managed element and dependent elements of the VM managed element, from a source host to a target host, the method comprising:
   (a) associating a mobile autonomic element having a sensor interface and an effector interface for managing migration of the service VM, the mobile autonomic element being an object, which is separate from the service VM;
   (b) migrating the service VM during an execution of the service VM using the mobile autonomic element, comprising:
      (i) migrating the mobile autonomic element separately from and concurrently with the service VM;

(ii) managing the migrating of the service VM under control of the mobile autonomic element, comprising:
(i1) preserving a state of the service VM by the mobile autonomic element;
(i2) migrating policies managing the service VM by using the mobile autonomic element; and
(c) at the target host, resuming execution of the service VM under control of the mobile autonomic element.

2. The method of claim 1, wherein the step (b) further comprises:
(d) queuing events to be processed at the source host;
(e) sending information regarding a state of the VM managed element and its dependent elements from the source host to the target host;
(f) sending information regarding a state of the events queued in step (d) from the source host to the target host;
(g) sending components of the VM managed element that have changed during the execution of step (d)-step (f) from the source host to the target host;
(h) processing the information sent in step (e) at the target host; and
(i) processing the information sent in step (f) at the target host.

3. The method of claim 1, wherein the step (b) further comprises:
(v) storing policies within the autonomic element; and
(w) migrating the policies contained in the autonomic element prior to executing the service VM on the target host.

4. The method of claim 2, wherein the step (d) further comprises:
locating a sensor service; and
creating a queue of events and preventing further events to be forwarded to the VM managed element.

5. The method of claim 2, wherein the step (e) further comprises:
(j) serializing the state of the VM managed element and its dependent elements; and
(k) sending a message containing a serialized state of the VM managed element and its dependent elements generated in step (j) from the source host to the target host.

6. The method of claim 2, wherein the step (f) further comprises:
(l) serializing the queued events for the VM managed element and its dependent elements at the source host; and
(m) sending a message including a serialized queue of events generated in step (l) to the target host.

7. The method of claim 2, wherein the step (g) further comprises:
(n) serializing the components of the VM managed element and its dependent elements that have changed; and
(o) sending serialized components of the VM managed element produced in step (n) from the source host to the target host.

8. The method of claim 2, wherein the step (h) further comprises:
deserializing the state of the VM managed element; and
extracting dependencies for its dependent elements at the target host.

9. The method of claim 2, wherein the step (i) further comprises:
(x) deserializing the queued events and creating queues of events at the target host; and
(y) locating a sensor service and inserting the queues of events created in step (x) into the sensor service.

10. The method of claim 1, wherein step (c) further comprises:
(p) starting events for the VM managed element and its dependent elements at the target host; and
(q) destroying the VM managed element at the source host.

11. The method of claim 10, wherein step (p) further comprises:
locating the sensor service; and
adding the events for the VM managed element and the dependent elements to a time-ordered queue of events stored within the sensor service.

12. The method of claim 10, wherein the step (q) further comprises stopping the events for the VM managed element and its dependent elements.

13. The method of claim 1, wherein the step (i1) further comprises preserving a state of the VM managed element and respective states of the dependent elements.

14. The method of claim 1, wherein the step (c) further comprises removing the VM managed element and the dependent elements at the source host.

15. A computer program product for migrating a service VM, comprising a non-transitory computer readable non-transitory storage medium having computer readable instructions embodied in said medium for causing said computer to perform the steps of the method as described in claim 1.

16. A system for migrating a service Virtual Machine (VM), comprising an operating system and applications running on a hypervisor, comprising a VM managed element and dependent elements of the VM managed element, from a source host to a target host, the system comprising a non-transitory computer readable storage medium having computer readable instructions stored thereon for execution by a processor, forming:
(a) a mobile autonomic element including a sensor interface, and an effector interface for managing migration of the service VM, the mobile autonomic element being an object, which is separate from the service VM;
(b) means for migrating the service VM during an execution of the service VM using the mobile autonomic element, comprising:
(i) means for migrating the mobile autonomic element separately from and concurrently with the service VM;
(ii) means for managing the migrating of the service VM using the mobile autonomic element, comprising:
(i1) means for preserving a state of the service VM by the mobile autonomic element;
(i2) means for migrating policies managing the service VM by using the mobile autonomic element; and
(c) at the target host, means for resuming execution of the service VM under control of the mobile autonomic element.

17. The system of claim 16, wherein means (b) further comprises:
(d) means for queuing events to be processed at the source host;
(e) means for sending information regarding a state of the VM managed element and its dependent elements from the source host to the target host;
(f) means for sending information regarding a state of the events queued from the source host to the target host;
(g) means for sending components of the VM managed element that have changed during the processing performed by the means (d)-(f) from the source host to the target host;
(h) means for processing the information sent by the means (e) at the target host; and
(i) means for processing the information sent by the means (f) at the target host.

18. The system of claim 17, wherein the means (c) further comprises:
  (v) means for storing policies within the autonomic element; and
  (w) means for migrating the policies contained in the autonomic element prior to executing the service VM on the target host.

19. The system of claim 16, wherein the means (d) further comprises:
  means for locating a sensor service; and
  means for creating a queue of events within the sensor service and
  preventing further events to be forwarded to the VM managed element.

20. The system of claim 17, wherein the means (e) further comprises:
  (j) means for serializing the state of the VM managed element and its dependent elements; and
  (k) means for sending a message containing a serialized state of the VM managed element and its dependent elements generated by the means (j) from the source host to the target host.

21. The system of claim 17, wherein the means (f) further comprises:
  (l) means for serializing the queued events for the VM managed element and its dependent elements at the source host; and
  (m) means for sending a message including a serialized queue of events generated by the means (l) to the target host.

22. The system of claim 17, wherein the means (g) further comprises:
  (n) means for serializing the components of the VM managed element and its dependent elements that have changed; and
  (o) means for sending serialized components of the VM managed element produced by the means (n) from the source host to the target host.

23. The system of claim 17 wherein the means (h) further comprises means for deserializing the state of the VM managed element and extracting dependencies for its dependent elements at the target host.

24. The system of claim 17, wherein the means (i) further comprises:
  (x) means for deserializing the queued events and creating queues of events at the target host; and
  (y) means for locating a sensor service and inserting the queues of events created by the means (x) into the sensor service.

25. The system of claim 16, wherein the means (c) further comprises:
  (p) means for starting events for the VM managed element and its dependent elements at the target host; and
  (q) means for destroying the VM managed element at the source host.

26. The system of claim 25, wherein the means (p) further comprises:
  means for locating the sensor service;
  means for adding the events for the VM managed element to a time-ordered queue of events stored within the sensor service; and
  means for adding the events the dependent elements of the VM managed element to a time-ordered queue of events stored within the sensor service.

27. The system of claim 25, wherein the means (q) further comprises means for stopping the events for the VM managed element and the dependent elements.

28. The system of claim 16, wherein the means (i1) further comprises means for preserving a state of the VM managed element and respective states of the dependent elements.

29. The system of claim 16, wherein the means (c) further comprises means for removing the VM managed element and the dependent elements at the source host.

30. A system for migrating a service Virtual Machine (VM), comprising an operating system and applications running on a hypervisor, comprising a VM managed element and dependent elements of the VM managed element, from a source host to a target host, the system comprising:
  a processor;
  a memory device having computer readable instructions stored thereon for execution by the processor, causing the processor to:
    (a) associate a mobile autonomic element having a sensor interface and an effector interface for managing migration of the service VM, the mobile autonomic element being an object, which is separate from the service VM;
    (b) migrate the service VM during an execution of the service VM using the mobile autonomic element, comprising:
      (i) migrating the mobile autonomic element separately from and concurrently with the service VM;
      (ii) managing the migrating of the service VM under control of the mobile autonomic element, comprising:
        (i1) preserving a state of the service VM by the mobile autonomic element;
        (i2) migrating policies managing the service VM by using the mobile autonomic element; and
    (c) at the target host, resume execution of the service VM under control of the mobile autonomic element.

31. The system of claim 30, wherein the computer readable instructions further cause the processor to:
  queue events for the VM managed element and the dependent elements to be processed at the source host, and send information regarding a state of the queued events from the source host to the target host;
  send information regarding a state of the VM managed element and its dependent elements from the source host to the target host; and
  sending components of the VM managed element that have changed since the queuing has begun from the source host to the target host.

32. The system of claim 31, wherein the computer readable instructions further cause the processor to start the events at the target host, comprising:
  locating the sensor service; and
  adding the events to a time-ordered queue of events stored within the sensor service.

33. The system of claim 31, wherein the computer readable instructions further cause the processor to:
  serialize the queued events and the state of the queued events; and
  send a message containing the serialized queue of events and the serialized state of the queued events from the source host to the target host.

34. The system of claim 33, wherein the computer readable instructions further cause the processor to:
  deserialize the queued events and create a queue of corresponding events at the target host;
  deserialize the state of the VM managed elements and the dependent elements; and
  locate the sensor interface and add the corresponding events to the sensor service.

35. The system of claim 30, wherein the computer readable instructions further cause the processor to:
  store policies for managing the service VM within the autonomic elements; and
  migrate the policies prior to executing the service VM on the target host.

36. The system of claim 30, wherein the computer readable instructions further cause the processor to preserve a state of the VM managed element and respective states of the dependent elements.

37. The system of claim 30, wherein the computer readable instructions further cause the processor to remove the VM managed element and the dependent elements at the source host.

* * * * *

UNITED STATES PATENT AND TRADEMARK OFFICE
CERTIFICATE OF CORRECTION

PATENT NO. : 8,370,832 B2  
APPLICATION NO. : 11/839481  
DATED : February 5, 2013  
INVENTOR(S) : Anthony Richard Phillip White It is certified that error appears in the above-identified patent and that said Letters Patent is hereby corrected as shown below:

Column 17, line 1, "claim 17," should read --claim 16,--.

Column 17, line 8, "claim 16," should read --claim 17,--.

Signed and Sealed this  
Twenty-sixth Day of March, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,370,832 B2
APPLICATION NO. : 11/839481
DATED : February 5, 2013
INVENTOR(S) : Anthony Richard Phillip White Page 1 of 1

It is certified that error appears in the above-identified patent and that said Letters Patent is hereby corrected as shown below:

In the Claims

Column 18, line 44, "sending" should read --send--.

Signed and Sealed this
Thirtieth Day of December, 2014

Michelle K. Lee
*Deputy Director of the United States Patent and Trademark Office*